(12) United States Patent
Iryoda et al.

(10) Patent No.: US 12,479,044 B2
(45) Date of Patent: Nov. 25, 2025

(54) SHEET METAL WORKING SYSTEM, LASER MACHINING APPARATUS, SHEET METAL WORKING METHOD, AND MACHINING REGION SETTING PROGRAM FOR LASER MACHINING

(71) Applicant: Yamazaki Mazak Corporation, Niwa-gun (JP)

(72) Inventors: Hikaru Iryoda, Niwa-gun (JP); Yoshihiko Sakai, Niwa-gun (JP); Tetsuro Nakamoto, Niwa-gun (JP)

(73) Assignee: YAMAZAKI MAZAK CORPORATION, Niwa-gun (JP)

( * ) Notice: Subject to any disclaimer, the term of this patent is extended or adjusted under 35 U.S.C. 154(b) by 761 days.

(21) Appl. No.: 17/685,379

(22) Filed: Mar. 3, 2022

(65) Prior Publication Data
US 2022/0184731 A1    Jun. 16, 2022

Related U.S. Application Data

(63) Continuation of application No. PCT/JP2019/042607, filed on Oct. 30, 2019.

(51) Int. Cl.
*B23K 26/03* (2006.01)
*B23K 26/38* (2014.01)
(Continued)

(52) U.S. Cl.
CPC ............ *B23K 26/032* (2013.01); *B23K 26/38* (2013.01); *G06V 10/141* (2022.01); *G06V 10/60* (2022.01); *B23K 2101/18* (2018.08)

(58) Field of Classification Search
CPC .. B23K 2101/18; B23K 20/126; B23K 26/10; B23K 26/032; B23K 26/38;
(Continued)

(56) References Cited

U.S. PATENT DOCUMENTS

| 8,094,036 B2 * | 1/2012 | Heberer ............... B23K 26/702 |
| | | 219/121.81 |
| 2002/0046999 A1 * | 4/2002 | Veikkolainen ....... B23K 9/1274 |
| | | 901/42 |

(Continued)

FOREIGN PATENT DOCUMENTS

| CN | 1701896 A | * 11/2005 | ............. B23K 26/10 |
| CN | 105128539 A | * 12/2015 | |

(Continued)

OTHER PUBLICATIONS

European Office Action for corresponding EP Application No. 19950323.6-1103, Mar. 20, 2024.
(Continued)

*Primary Examiner* — Jimmy Chou
(74) *Attorney, Agent, or Firm* — MORI & WARD, LLP

(57) ABSTRACT

A sheet metal working system includes a laser machining apparatus for processing a sheet metal in a laser machining region, a camera for photographing the laser machining region, an illuminator for illuminating the sheet metal, and circuitry configured to process an image photographed by the camera. The laser machining apparatus includes a sheet metal support member having a plate shape, the sheet metal support member having a plurality of elongated projections arranged in a first direction in a laser machining region. The sheet metal is disposed on the plurality of elongated projections. The camera is arranged such that the optical axis of the camera is oriented substantially parallel to the first direction when viewed in the height direction of the laser machining apparatus. The circuitry detects a bright region in the image as a machining available area of the sheet metal.

16 Claims, 17 Drawing Sheets

(51) Int. Cl.
*G06V 10/141* (2022.01)
*G06V 10/60* (2022.01)
*B23K 101/18* (2006.01)

(58) Field of Classification Search
CPC .......................... G03B 21/147; G03B 21/208; G03B 21/2053; H04N 9/3185; H04N 9/3194
See application file for complete search history.

(56) References Cited

U.S. PATENT DOCUMENTS

| | | | |
|---|---|---|---|
| 2008/0101687 A1 | 5/2008 | Goeller | |
| 2009/0250445 A1 | 10/2009 | Yamaguchi et al. | |
| 2009/0312858 A1* | 12/2009 | Alpay | B23K 26/38 |
| | | | 700/103 |
| 2010/0206856 A1* | 8/2010 | Tanaka | B23K 26/03 |
| | | | 219/121.64 |
| 2013/0068738 A1 | 3/2013 | Schurmann et al. | |
| 2018/0221990 A1* | 8/2018 | Aoki | G02B 26/10 |

FOREIGN PATENT DOCUMENTS

| | | | | |
|---|---|---|---|---|
| DE | 10016195 A1 * | 10/2001 | ............ | B21C 51/00 |
| EP | 1342527 | 9/2003 | | |
| JP | 2002-239774 | 8/2002 | | |
| JP | 2010-171119 | 8/2010 | | |
| JP | 2011-005502 | 1/2011 | | |
| JP | 2012-101245 | 5/2012 | | |
| JP | 2016/109646 | 6/2016 | | |
| JP | 2016/203294 | 12/2016 | | |
| JP | 6535502 | 12/2016 | | |
| JP | 2018-065178 | 4/2018 | | |
| JP | 6371358 B2 | 4/2018 | | |
| KR | 20150026895 A * | 3/2015 | ............ | B23K 26/50 |

OTHER PUBLICATIONS

European Office Action for corresponding EP Application No. 19950323.6-1103, Jun. 28, 2023.
Chinese Office Action for corresponding CN Application No. 201980101675.6, Aug. 31, 2022.
Supplementary European Search Report for corresponding EP Application No. 19950323.6-1103, Oct. 7, 2022.
European Office Action for corresponding EP Application No. 19950323.6-1103, Nov. 3, 2022.
International Search Report for corresponding International Application No. PCT/JP2019/042607, Jan. 28, 2020.
Written Opinion for corresponding International Application No. PCT/JP2019/042607, Jan. 28, 2020.
Japanese Office Action for corresponding JP Application No. 2020-507718, May 26, 2020 (w/ English machine translation).
Chinese Office Action for corresponding CN Application No. 201980101675.6, Feb. 28, 2023.
The International Preliminary Report on Patentability (Chapter I) with translation of Written Opinion for corresponding International Application No. PCT/JP2019/042607, May 3, 2022.

* cited by examiner

SHEET METAL WORKING SYSTEM, LASER MACHINING APPARATUS, SHEET METAL WORKING METHOD, AND MACHINING REGION SETTING PROGRAM FOR LASER MACHINING

CROSS-REFERENCE TO RELATED APPLICATIONS

The present application is a continuation application of International Application No. PCT/JP2019/042607, filed Oct. 30, 2019. The contents of this application are incorporated herein by reference in their entirety.

BACKGROUND OF THE INVENTION

Field of the Invention

The present invention relates to a sheet metal working system, a laser machining apparatus, a sheet metal working method, and a machining region setting program for laser machining.

Discussion of the Background

Japanese Patent Application Laid-Open No. 2011-5502 discloses a cutting apparatus that captures an image of a cuttable region of a sheet metal by a camera, recognizes the shape and dimensions of the sheet metal arranged in the cuttable region from the captured image, and allocates shapes to be cut from the sheet metal.

SUMMARY OF THE INVENTION

According to a one aspect of the present disclosure, a sheet metal working system includes a laser machining apparatus to machine a sheet metal in a laser machining region. The laser machining apparatus includes a sheet metal support member having a plate-shape, the sheet metal support member having a plurality of protrusions arranged in a first direction in a laser machining region such that the sheet metal is disposed on the plurality of protrusions. The sheet metal working system includes a camera configured to photograph the laser machining region, the camera being arranged such that an optical axis of the camera is oriented substantially parallel to the first direction when viewed in the height direction along a height of the laser machining apparatus. The sheet metal working system includes an illuminator to illuminate the sheet metal and circuitry configured to process an image captured by the camera to detect a bright region in the image as a machining available area of the sheet metal.

According to another aspect of the present disclosure, a laser machining apparatus includes: a laser head to machine a sheet metal in a laser machining region; a sheet metal support member having a plate-shape, the sheet metal support member having a plurality of protrusions arranged in a first direction in the laser machining region such that the sheet metal is disposed on the plurality of protrusions; a camera to photograph the laser machining region, the camera being arranged such that the optical axis of the camera is oriented substantially parallel to the first direction when viewed in the height direction of the laser machining apparatus; an illuminator to illuminate the sheet metal; and circuitry configured to process an image photographed by the camera to detect a bright region in the image as a machining available area of the sheet metal.

According to further aspect of the present disclosure, a sheet metal working method includes: mounting a sheet metal support member having a plate-shape, the sheet metal support member having a plurality of protrusions arranged in a first direction in a laser machining region to a laser machining apparatus; arranging a camera to photograph the laser machining region such that an optical axis of the camera is substantially parallel to the first direction when viewed in a height direction along a height of the laser machining apparatus; disposing a sheet metal on the plurality of protrusions in the laser machining region; illuminating the sheet metal by an illuminator; acquiring an image captured by the camera; and detecting a bright region in the image as a machining available area of the sheet metal.

According to further aspect of the present disclosure, a non-transitory computer-readable recording medium stores a program for causing a computer to execute a process including: acquiring an image of a sheet metal mounted on a plurality of protrusions, the sheet metal being illuminated by an illuminator, the image being captured by a camera that is arranged such that an optical axis of the camera is substantially parallel to a first direction when viewed in a height direction of the laser machining apparatus, the plurality of protrusions being arranged in the first direction; and detecting a bright region in the image as a machining available area of the sheet metal.

According to the technology disclosed in the present application, for example, the sheet metal support member is displayed in a small size in the image, and the possibility that the sheet metal support member is detected as a bright region is reduced. Therefore, even if the sheet metal support member is photographed, the shape and dimensions of the sheet metal to be machined can be recognized from the photographed image.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings.

DESCRIPTION OF THE EMBODIMENTS

Figure 1:
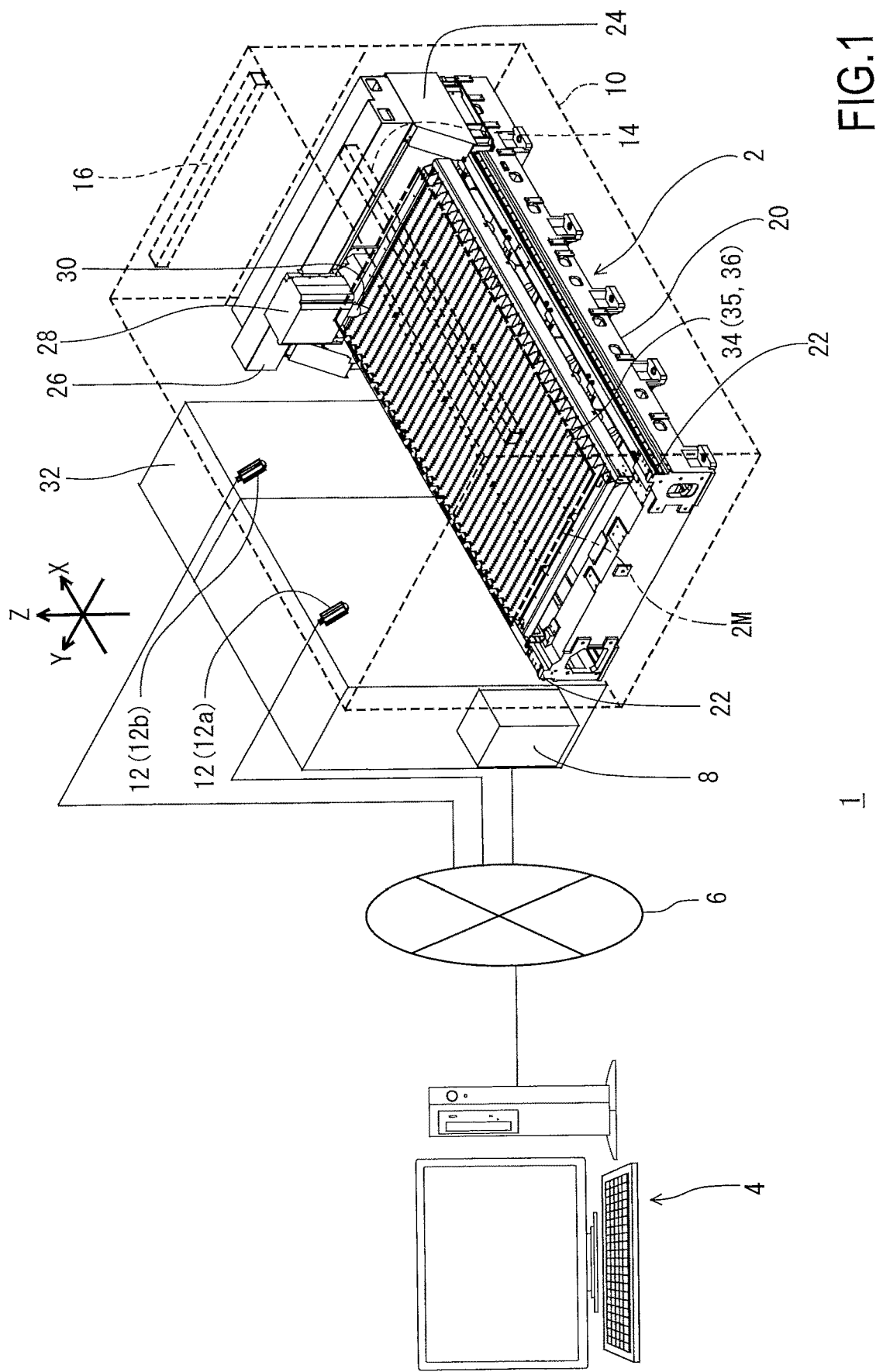
FIG. 1 is a diagram illustrating a schematic configuration of a sheet metal working system according to an embodiment.

The present invention will now be described with reference to the accompanying drawings, wherein like reference numerals designate corresponding or identical elements throughout the various drawings.

Figure 2:
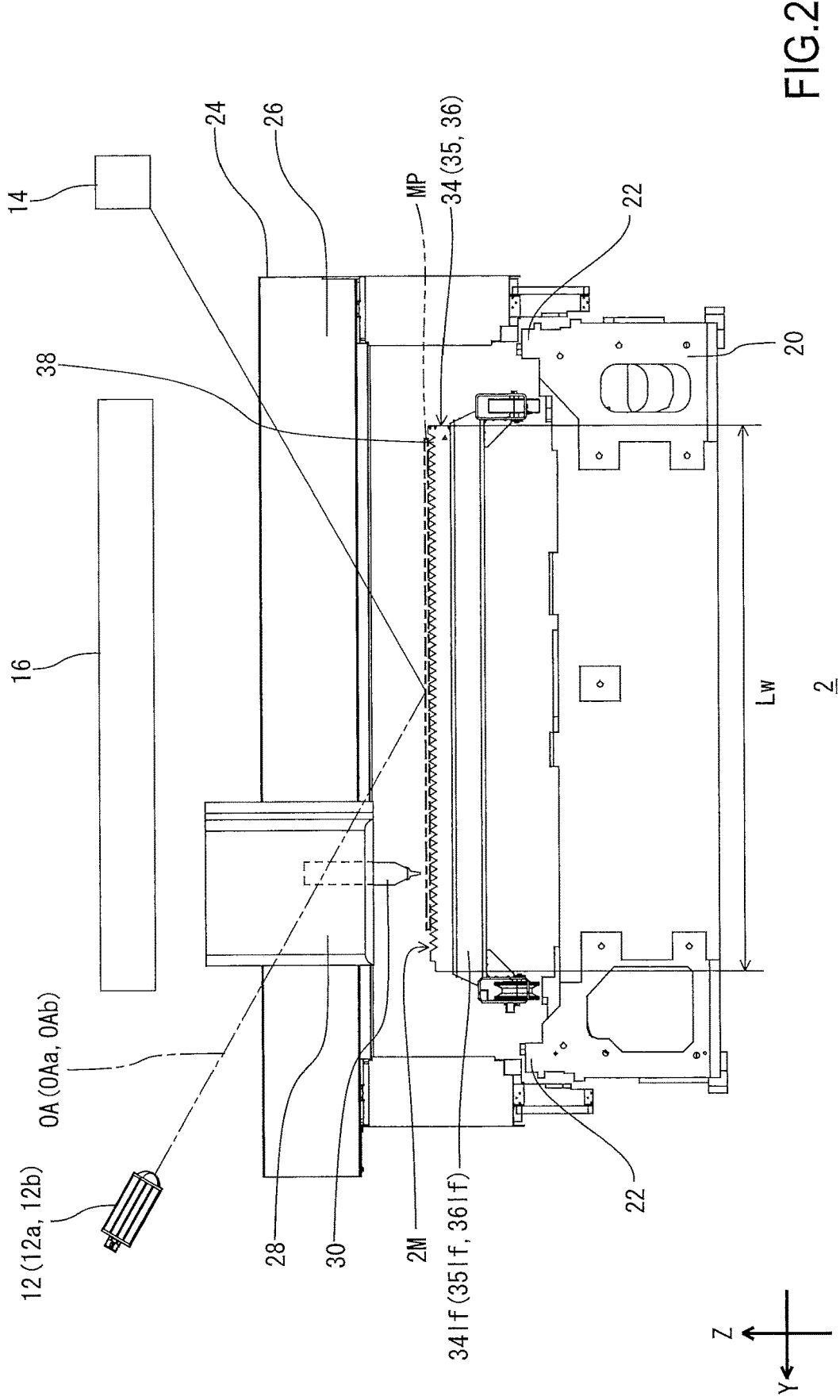
FIG. 2 is a front view of a laser machining apparatus according to the embodiment.
Figure 3:
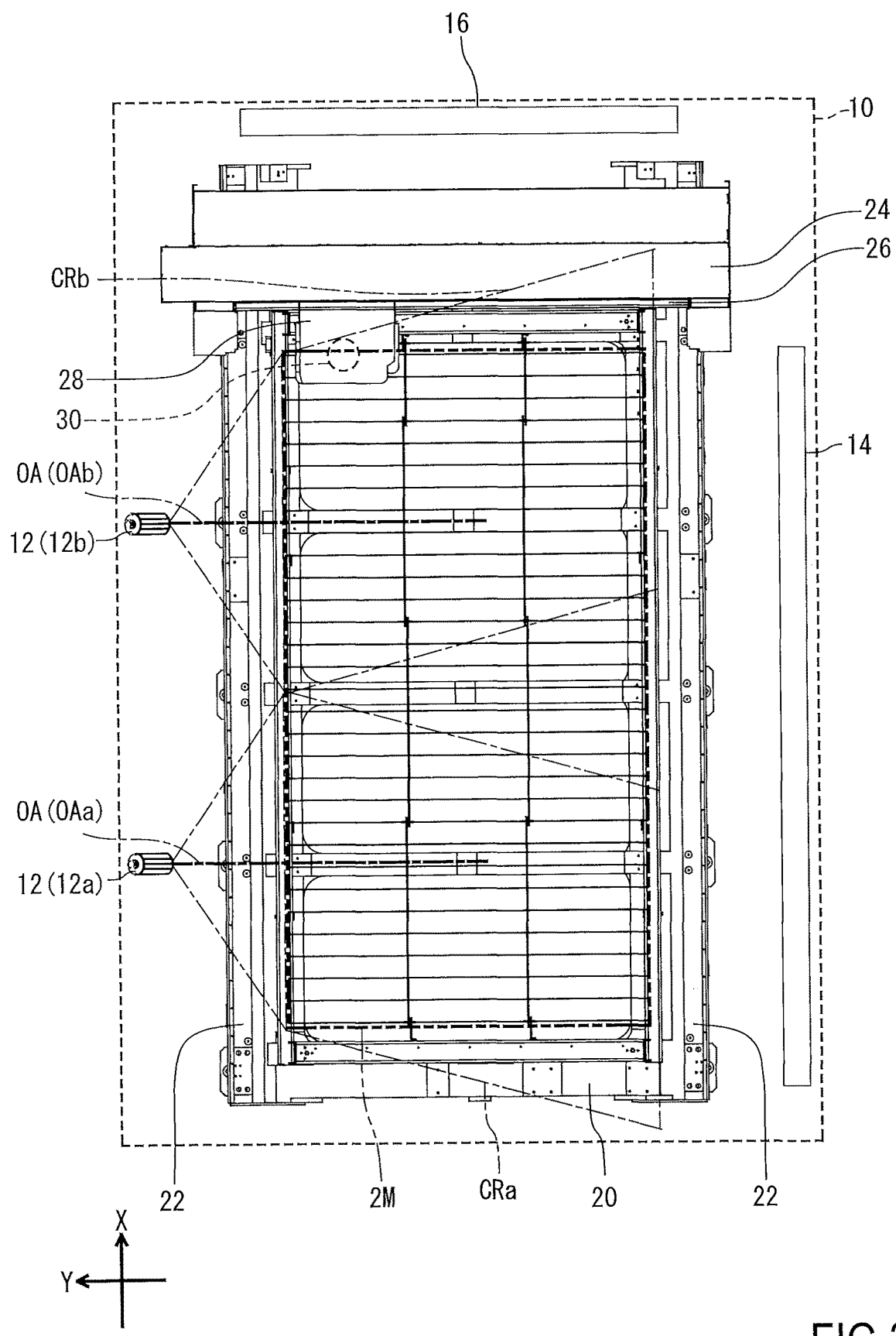
FIG. 3 is a plan view of a laser machining apparatus according to the embodiment.

FIG. 1 shows a schematic configuration of a sheet metal working system 1 according to an embodiment of the present invention. The sheet metal working system 1 includes a laser machining apparatus 2, a computer 4, and a network 6 that connects the laser machining apparatus 2 and the computer 4. FIG. 2 is a front view of a laser machining apparatus 2 according to the embodiment of the present invention. FIG. 3 is a plan view of a laser machining apparatus 2 according to the embodiment of the present invention. An X-axis shown in FIGS. 1 to 3 is along a depth direction of the laser machining apparatus 2, a Y-axis is along a width direction of the laser machining apparatus 2, and a Z-axis is along a height direction of the laser machining apparatus 2. Hereinafter, directions along the X axis, the Y axis, and the Z axis are referred to as an X direction, a Y direction, and a Z direction, respectively. In addition, the Y direction may be referred to as a first direction, and the X direction may be referred to as a second direction. The first direction (Y direction), the second direction (X direction), and the height direction (Z direction) are perpendicular to each other.

The laser machining apparatus 2 is an apparatus to machine a sheet metal MP (metal plate) (see FIG. 2) in a laser machining region 2M (see FIGS. 1 and 3). As shown in FIGS. 1 to 3, the laser machining apparatus 2 includes a base 20, first guide rails 22, a column 24, a second guide rail 26, a saddle 28, a laser head 30, a laser oscillator 32, a numerical control apparatus 8, and a plurality of elongated projections 34 (a metal plate support member 35 and at least one additional metal plate support member 36). A pair of first guide rails 22 are attached to both ends of the base 20 in the Y direction, and a column 24 is attached to the first guide rails 22 so as to be movable on the first guide rails 22. The column 24 moves on the first guide rails 22 by a driving force formed by the first guide rails 22 and the column 24 and caused by a motor, for example.

The column 24 is provided with a second guide rail 26 along the Y-axis orthogonal to the X-axis, and a saddle 28 is mounted movably in the Y-direction. The saddle 28 moves on the second guide rail 26 by a driving force formed between the second guide rail 26 and the saddle 28 and caused by a motor, for example. Although not shown, the column 24 may be covered with a bellows-like cover. A laser head 30 is attached to the saddle 28 so as to be movable in the Z direction along the Z axis perpendicular to the X axis and the Y axis. The laser head 30 is configured to machine the sheet metal MP in the laser machining region 2M. The laser head 30 includes an optical system into which a laser beam transmitted from the laser oscillator 32 is introduced. The laser head 30 includes a torch for laser machining. The numerical control apparatus 8 communicates with the computer 4 via the network 6, and controls the operations of the column 24, the saddle 28, and the laser head 30 so as to machine the sheet metal MP based on machining information transmitted from the computer 4. The network 6 is, for example, a local area network (LAN) installed in a factory. Although the network 6, which is illustrated, is a wired network, the network 6 may be a wireless network.

The plurality of elongated projections 34 are plate-shaped members for supporting the sheet metal MP (see FIG. 2). In the following embodiments, any one of the plurality of elongated projections 34 is referred to as a sheet metal support member 35, and the rest of the plurality of elongated projections 34 is referred to as at least one additional sheet metal support member 36. The sheet metal support member 35 and the at least one additional sheet metal support member 36 are arranged in the second direction (X direction). The plurality of elongated projections 34 are detachably attached to the base 20. Thus, the sheet metal support member 35 and the at least one additional sheet metal support member 36 can be replaced when dross is deposited thereon. The plurality of elongated projections 34 are preferably made of a metal that is resistant to laser machining. For example, the plurality of elongated projections 34 are preferably made of galvanized iron.

The plurality of elongated projections 34 have substantially the same shape. That is, the at least one additional sheet metal support member 36 have substantially the same shape as the sheet metal support member 35. Here, the term "substantially the same shape" means that a plate thickness of the plurality of elongated projections 34 (a length Lt (see FIG. 5) of the elongated projections 34 in the X direction when placed on the base 20) may be different within a range of about 2 times plus a manufacturing error, but the other shapes are different only by about the manufacturing error.

Figure 4:
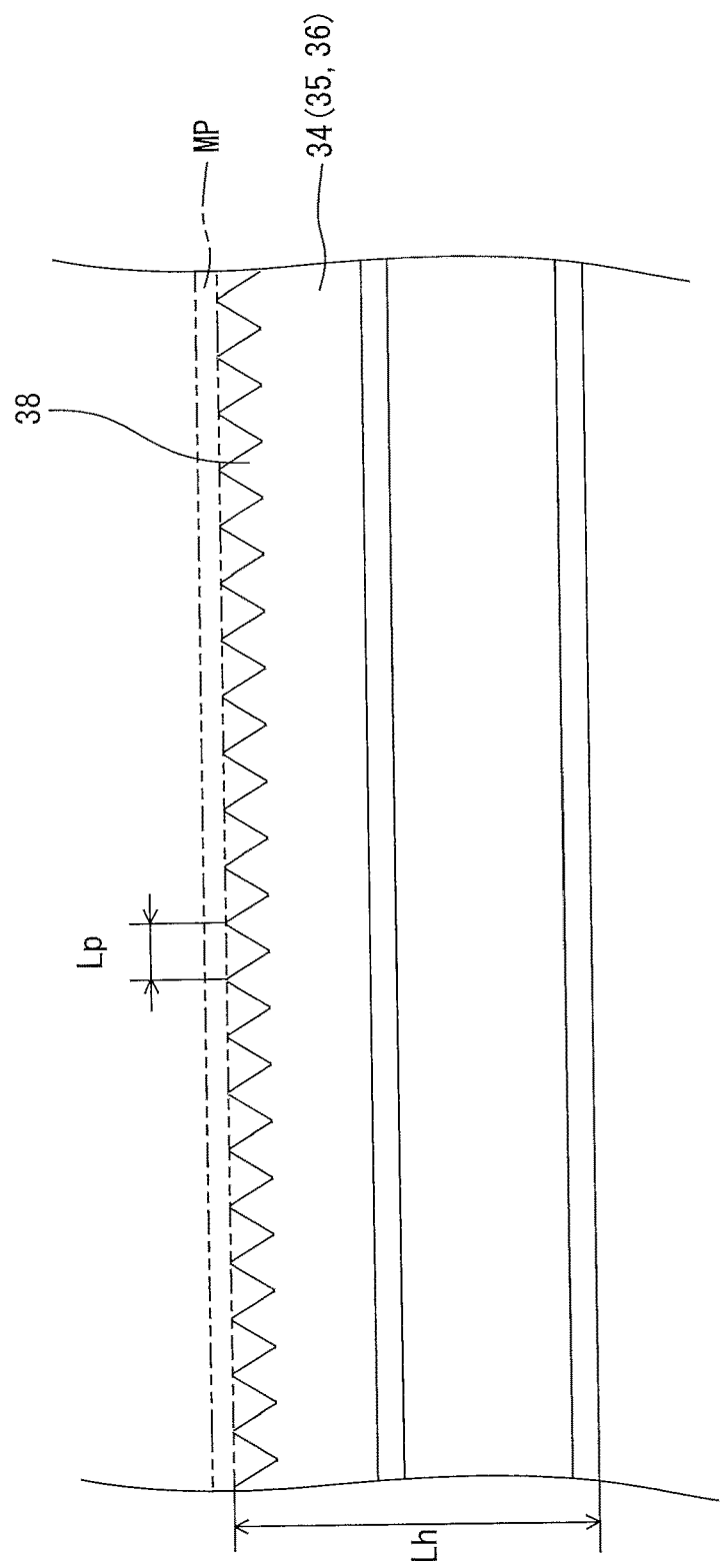
FIG. 4 is an enlarged view of the vicinity of the center of the sheet metal support member of FIG. 2.

Specifically, as shown in FIG. 2, the sheet metal support member 35 (at least one additional sheet metal support member 36) has a plurality of protrusions 38 arranged in the first direction (Y direction) in the laser machining region 2M. The sheet metal MP is disposed on the plurality of protrusions 38. FIG. 4 is an enlarged view of the vicinity of the center of the sheet metal support member 35 (at least one additional sheet metal support member 36) of FIG. 2. Referring to FIGS. 2 and 4, the plurality of protrusions 38 form serrations. However, the shape of the plurality of protrusions 38 is not limited thereto. The plurality of protrusions 38 may be spiny protrusions. The plurality of protrusions 38 are provided to be separated from each other by substantially the same pitch Dp in the Y direction. In the following description, an intersection between a straight line perpendicular to the Z-axis passing through a predetermined position (for example, the initial position of the laser head 30) and a plane (a plane formed by connecting the tips of the plurality of protrusions 38) defining the laser machining region 2M is defined as an origin, and distances from the origin in the X-direction, the Y-direction, and the Z-direction are referred to as an X-coordinate, a Y-coordinate, and a Z-coordinate, respectively. A coordinate space represented by the X coordinate, the Y coordinate, and the Z coordinate is referred to as an XYZ coordinate space.

Figure 5:
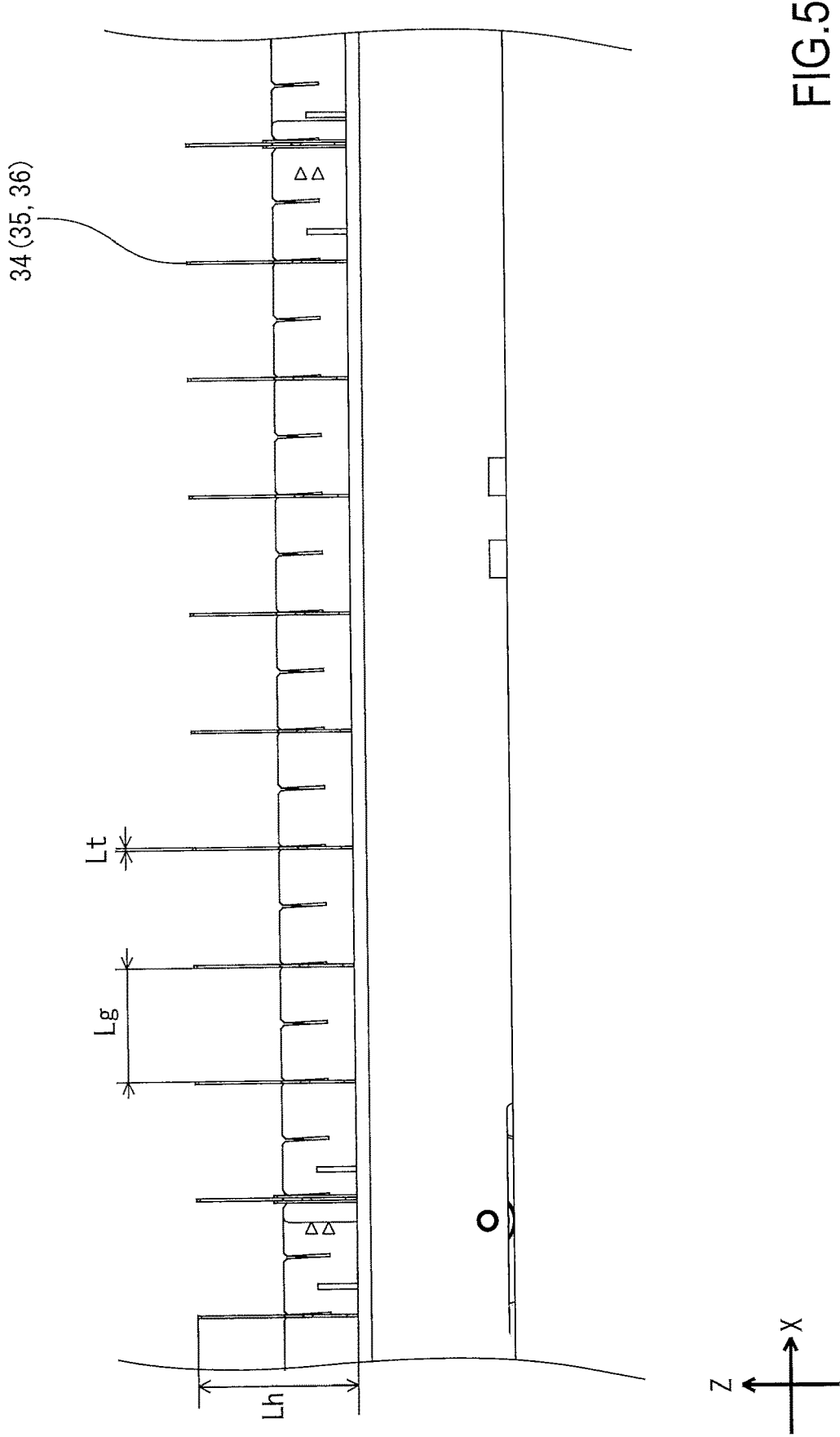
FIG. 5 is an enlarged view of the central portion of the laser machining region as viewed in the Y direction.

FIG. 5 is an enlarged view of the central portion of the laser machining region 2M as viewed in the Y direction. Referring to FIGS. 2 and 5, a width Lt of the sheet metal support member 35 (at least one additional sheet metal support member 36) in the second direction (X direction) is shorter than a length Lw of the sheet metal support member 35 (at least one additional sheet metal support member 36)

in the first direction (Y direction) and a length Lh of the sheet metal support member 35 (at least one additional sheet metal support member 36) in the height direction (Z direction). Further, a distance Lg in the second direction (X direction) between two closest members of the sheet metal support member 35 and the at least one additional sheet metal support member 36 is longer than 20 times the width Lt. Thus, a sheet metal conveying device (not shown) can be provided between the plurality of elongated projections 34.

Referring to FIGS. 1 to 3, the sheet metal working system 1 includes an exterior panel (a covering panel) 10, cameras 12 (12a and 12b), and an illuminator (a lighting) 14. The exterior panel 10 covers the laser machining region 2M. This ensures safety during laser machining. To be specific, the exterior panel 10 covers the laser machining apparatus 2, the cameras 12 (12a and 12b), and the illuminator 14. However, the exterior panel 10 may not cover the laser oscillator 32 and the numerical control apparatus 8 of the laser machining apparatus 2.

The camera 12 (12a, 12b) is configured to photograph the laser machining region 2M. The cameras 12 (12a, 12b) are preferably network cameras, and can transmit captured images to the computer 4 via the network 6. In the present embodiment, since the entirety of the laser machining region 2M cannot be photographed by a single camera, an embodiment in which the cameras 12, which are two, are arranged is shown, but the entirety of the laser machining region 2M may be photographed by a single wide-angle camera. FIG. 3 illustrates, as CRa and CRb, portions of the laser machining region 2M imaged by the cameras 12a and 12b, respectively, in a case where the aberrations of the lenses of the cameras 12a and 12b are not considered. In this manner, the one or more cameras 12 are disposed in the exterior panel 10 so that the entirety of the laser machining region 2M is photographed. The cameras 12a and 12b may photograph a wider area than the illustrated CRa and CRb.

As shown in FIGS. 2 and 3, the cameras 12 (12a, 12b) are arranged such that optical axes OA (OAa, OAb) of the cameras 12 (12a, 12b) are substantially parallel to the first direction (Y direction) when viewed in the height direction (Z direction) of the laser machining apparatus 2. The cameras 12 (12a, 12b) are disposed at positions that do not overlap the laser machining region 2M when viewed from the height direction (Z direction). The optical axes OA (OAa, OAb) are directed to a central portion of the laser machining region 2M in the first direction (Y direction).

The illuminator 14 is configured to illuminate the sheet metal MP. The illuminator 14 is disposed on a side opposite to the cameras 12 (12a, 12b) with respect to the laser machining region 2M when viewed from the height direction (Z direction). The illuminator 14 is disposed at a position that does not overlap the laser machining region 2M when viewed from the height direction (Z direction). The sheet metal working system 1 may further include an additional illuminator (an additional lighting) 16 to brighten the vicinity of the column 24. In this case, the exterior panel 10 also covers the additional illuminator 16. The additional illuminator 16 is disposed at a position that does not overlap the laser machining region 2M when viewed from the height direction (Z direction). The additional illuminator 16 may be omitted. An interior surface of the exterior panel 10 facing the laser machining region 2M is preferably white. Accordingly, the light of the illuminator 14 and the additional illuminator 16 is reflected by the interior surface, and the laser machining region 2M becomes brighter.

Figure 6:
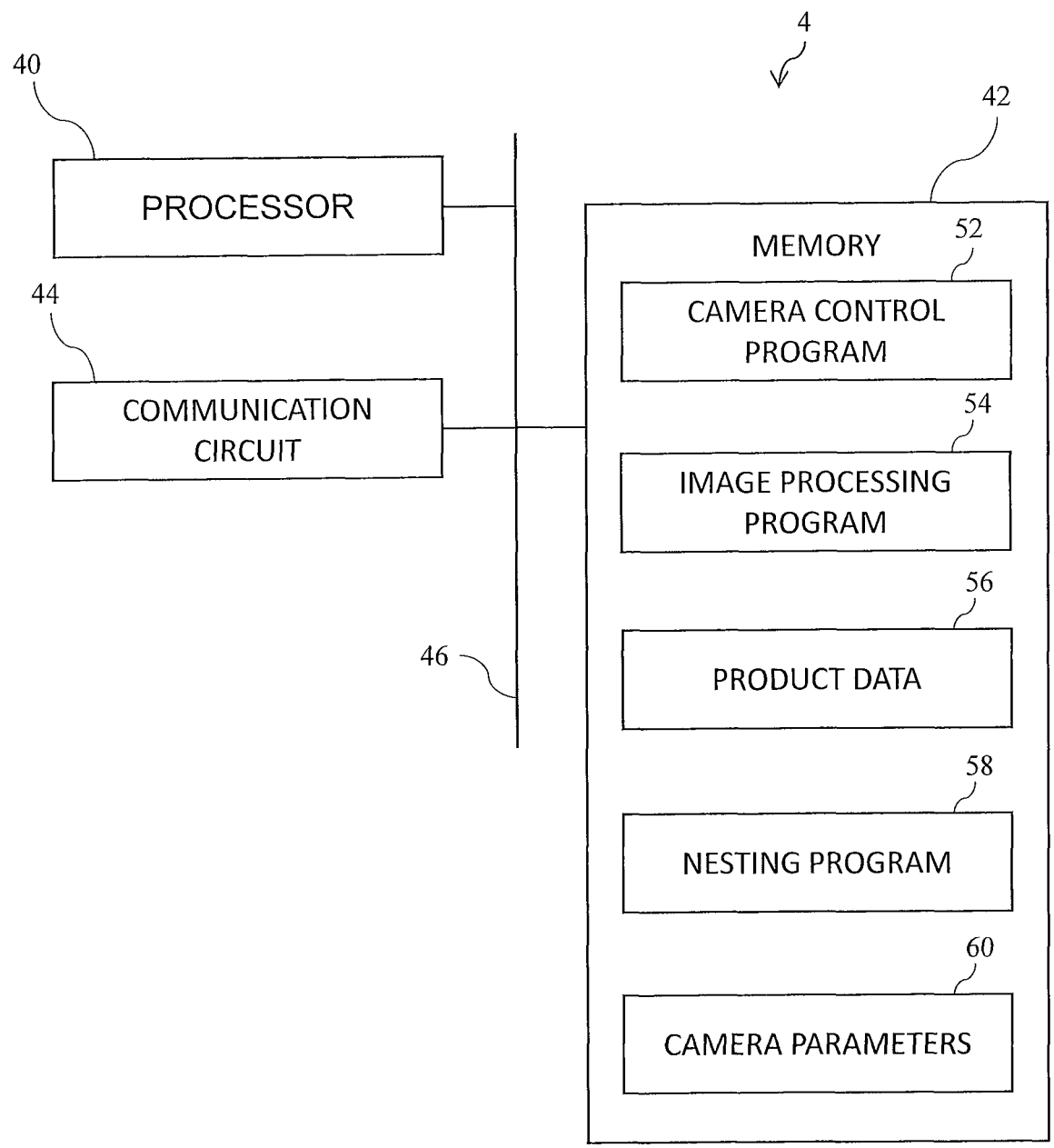
FIG. 6 is a hardware block diagram of a computer according to the embodiment.

FIG. 6 is a hardware block diagram of the computer 4 according to the embodiment. As shown in FIG. 6, the computer 4 includes a processor (circuitry) 40, a memory 42, and a communication circuit 44. The processor 40, the memory 42, and the communication circuit 44 are connected to each other via a bus 46. The communication circuit 44 has a communication packet-to-data conversion function, a data-to-communication packet conversion function, and a communication packet transmission/reception function for communicating with the numerical control apparatus 8 and the cameras 12 (12a and 12b) via the network 6.

The memory 42 stores a camera control program 52 for controlling the cameras 12 (12a, 12b), an image processing program 54 for processing images captured by the cameras 12 (12a, 12b), product data (workpiece data) 56 that define the shape of a product (a workpiece) to be obtained by machining the sheet metal MP with the laser machining apparatus 2 such as three-dimensional CAD data of a product, a nesting program 58 for allocating the surface shape of the sheet metal MP to target shapes, and camera parameters 60 for lens aberration correction of the cameras 12 (12a, 12b) and projective transformation of captured images. The processor 40 reads a program stored in the memory 42 and executes the read program. In the following embodiments, the image processing program 54 may be referred to as a machining region setting program, and the image processing program 54 and the nesting program 58 may be collectively referred to as a machining region allocation program.

The camera control program 52 is programmed to transmit a control signal to the cameras 12 (12a and 12b) and receive digital images captured by the cameras 12 (12a and 12b) by using the communication circuit 44. The image processing program 54 is programmed to receive a control signal from the numerical control apparatus 8 through the communication circuit 44, process the received digital image according to the control signal, and output an image of a processing result to the numerical control apparatus 8. That is, the processor 40 processes images captured by the cameras 12 (12a and 12b). The nesting program 58 is programmed to receive a control signal from the numerical control apparatus 8 through the communication circuit 44, select product data 56 corresponding to the control signal, generate machining region data 92 in which a target shape is allocated in the surface shape of the sheet metal MP, and output to the numerical control apparatus 8, the machining region data 92 that is generated. When the control signal from the numerical control apparatus 8 includes information corresponding to the product data 56, the nesting program 58 may be programmed to generate the machining region data based only on the control signal from the numerical control apparatus 8.

In the above description, an example is described in which the image processing program 54 and the nesting program 58 operate based on the control signal from the numerical control apparatus 8. However, the computer 4 may further include an input interface via which an input corresponding to the control generation and commands of the camera control program 52, the image processing program 54, and the nesting program 58 are input. Although the image processing program 54 and the nesting program 58 output the processing results to the numerical control apparatus 8, the computer 4 may further include a display for displaying the processing results.

Figure 7:
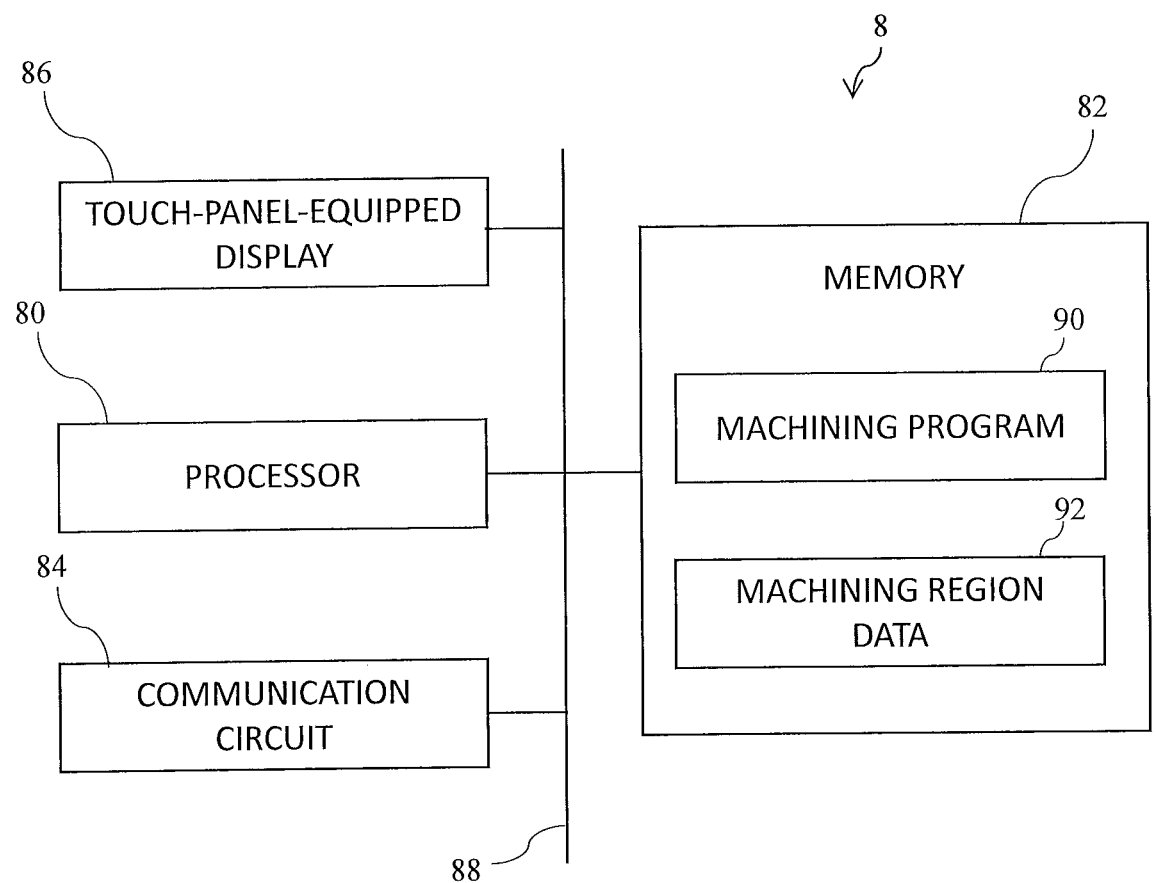
FIG. 7 is a hardware block diagram of a numerical control apparatus according to the embodiment.

FIG. 7 is a hardware block diagram of the numerical control apparatus 8 according to the embodiment. As shown in FIG. 7, the numerical control apparatus 8 includes a processor 80, a memory 82, a communication circuit 84, and a touch-panel-equipped display 86. The processor 80, the memory 82, the communication circuit 84, and the touch-panel-equipped display 86 are connected to one another via a bus 88. The communication circuit 84 has a communication packet-to-data conversion function, a data-to-communication packet conversion function, and a communication packet transmission/reception function for communicating with the computer 4 via the network 6.

The memory 82 stores a machining program 90 and machining region data 92. As described above, the machining region data 92 is data in which a target shape is allocated in the surface shape of the sheet metal MP. The machining region data 92 is received from the computer 4 via the communication circuit 84. The machining program 90 is programmed to control the column 24, the saddle 28, and the laser head 30 based on the machining region data 92. Further, the machining program 90 is programmed to generate a control signal to the image processing program 54 and the nesting program 58 of the computer 4 based on the operation of the touch panel by the user, and to display the processing results of the image processing program 54 and the nesting program 58 on the touch-panel-equipped display 86.

The touch-panel-equipped display 86 is an example of a display, and the touch panel is an example of an interface. The touch-panel-equipped display 86 may be replaced by a combination of a display without a touch panel and an input device such as a button, a switch, a lever, or a pointing device provided around the display. In this case, the input device is an example of an interface.

Figure 8:
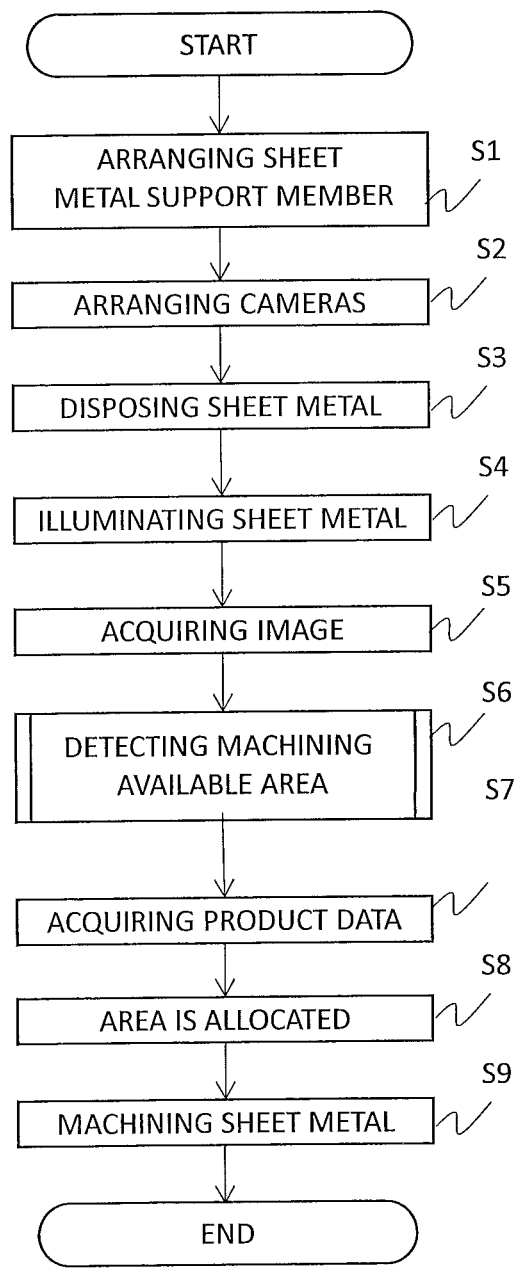
FIG. 8 is a flowchart showing sheet metal working according to the embodiment.

Next, a sheet metal working method according to the present embodiment will be described. FIG. 8 is a flowchart illustrating a sheet metal working method according to the embodiment. In this method, in step S1, the sheet metal support member 35 (at least one additional sheet metal support member 36) having a plate-shape, the sheet metal support member 35 having the plurality of protrusions 38 arranged in the first direction (Y direction) in the laser machining region 2M is attached to the laser machining apparatus 2. In step S2, the cameras 12 (12a, 12b) for imaging the laser machining region 2M are arranged such that the optical axes OA (OAa, OAb) are oriented substantially parallel to the first direction (Y direction) when viewed from the height direction (Z direction) of the laser machining apparatus 2. In step S3, the sheet metal MP is disposed on the plurality of protrusions 38 in the laser machining region 2M. In step S4, the sheet metal MP is illuminated by the illuminator 14 (additional illuminator 16). The processes of steps S1 to S4 described above may be performed in any order except that step S1 is performed before step S3.

Figure 9:
FIG. 9 shows an example of an image of a laser machining region photographed by a camera.
Figure 10:
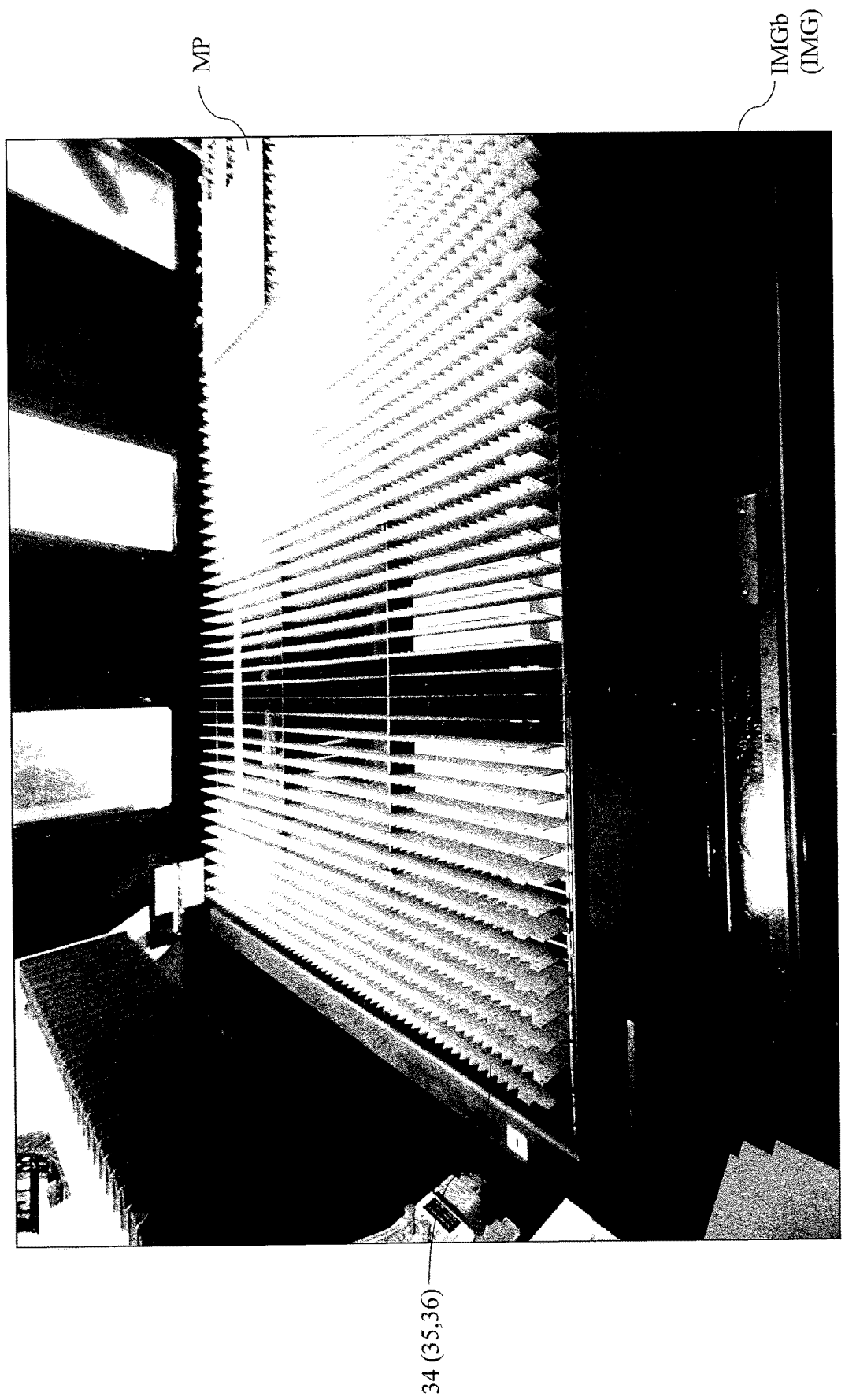
FIG. 10 shows an example of an image of a laser machining region photographed by a camera.

Next, in step S5, images IMG (IMGa, IMGb) captured by the cameras 12 (12a, 12b) is acquired. To be more specific, the instructions of the image processing program 54 to acquire images IMG (IMGa, IMGb) of sheet metal MP arranged on plurality of protrusions 38 and illuminated by illuminator 14 (additional illuminator 16), the images being captured by cameras 12 (12a, 12b) that are arranged such that optical axes OA (OAa, OAb) are substantially parallel to a first direction (Y direction) in which plurality of protrusions 38 of sheet metal support member 35 (at least one additional sheet metal support member 36) that is attached to laser machining apparatus 2 are arranged, when viewed from the height direction (Z direction) of laser machining apparatus 2 are executed by the computer 4. That is, processor 40 performs a process of acquiring images IMG (IMGa, IMGb) of sheet metal MP arranged on the plurality of protrusions 38 and illuminated by the illuminator 14 (the additional illuminator 16), the images being captured by cameras 12 (12a, 12b) arranged such that optical axes OA (OAa, OAb) are substantially parallel to a first direction (Y direction) in which the plurality of protrusions 38 of sheet metal support member 35 (at least one additional sheet metal support member 36) that is attached to laser machining apparatus 2 are arranged, when viewed from the height direction (Z direction) of the laser machining apparatus 2. FIGS. 9 and 10 show examples of images IMG (IMGa and IMGb) obtained by photographing the laser machining region 2M by the cameras 12a and 12b, respectively.

Figure 11:
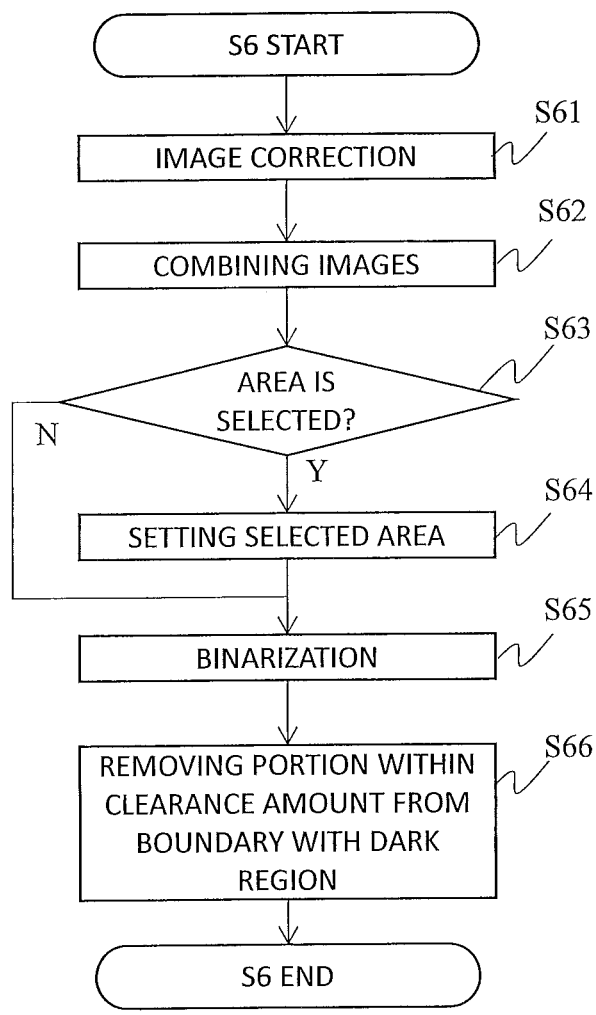
FIG. 11 is a flowchart showing a detailed processing flow of step S6 of FIG. 8.

In this method, in step S6, the bright region in the images IMG (IMGa, IMGb) is detected as the machining available area MAA (see FIG. 14) of the sheet metal MP. More specifically, the computer 4 executes an instruction of the image processing program 54 to detect a bright region in the images IMG (IMGa, IMGb) as the machining available area MAA of sheet metal MP. That is, the processor 40 executes a process of detecting a bright region in the images IMG (IMGa, IMGb) as the machining available area MAA of the sheet metal MP. FIG. 11 is a flowchart showing a detailed processing flow of step S6.

In FIG. 11, in step S61, a corrected image is generated by performing lens aberration correction and keystone correction on the images IMG (IMGa, IMGb). More specifically, the computer 4 executes an instruction of the image processing program 54 to generate a corrected image obtained by performing lens aberration correction and keystone correction on the images IMG (IMGa, IMGb). That is, the processor 40 executes a process of generating a corrected image obtained by performing lens aberration correction and keystone correction on the images IMG (IMGa, IMGb). For this reason, the lens distortion parameters of the cameras 12 (12a and 12b) and the parameters for projective transformation to an image viewed from the height direction (Z direction) are measured in advance by calibration, and the measured parameters are stored in the memory 42 as the camera parameters 60. The image processing program 54 includes program codes of a well-known lens aberration correction algorithm and a well-known keystone correction algorithm (projective transformation algorithm). The program code may be a library called from the image processing program 54. When the image processing program 54 is executed, the processor 40 reads the camera parameters 60 from the memory 42 and executes the lens aberration correction algorithm and the keystone correction algorithm. When the lens aberration of the camera 12 (12a, 12b) is substantially zero or very small in step S61, the lens aberration correction may be omitted in step S61.

Figure 12:
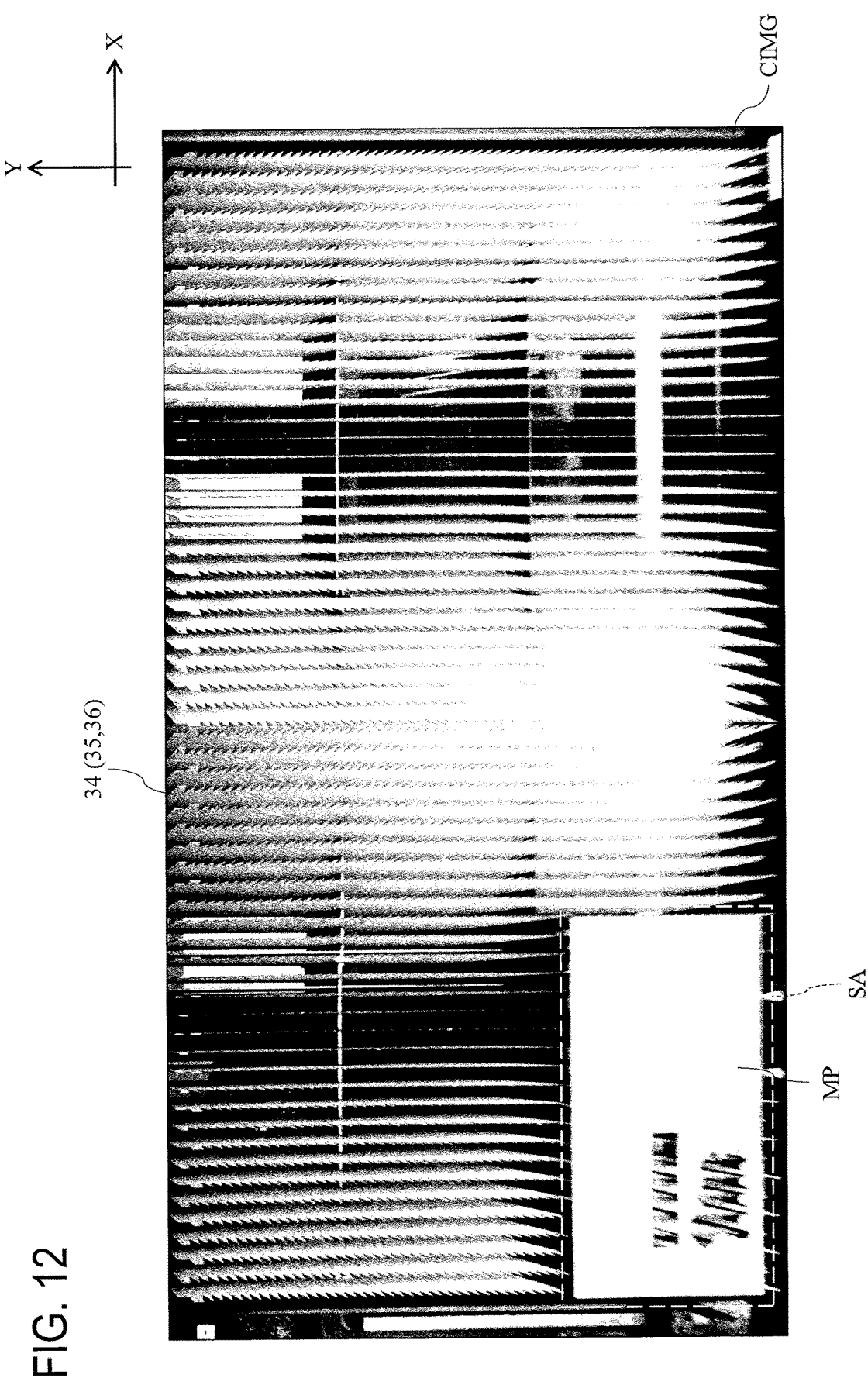
FIG. 12 shows an example of a composite image displaying a laser machining region.

In step S62, when there are a plurality of images to be corrected, the plurality of images to be corrected are combined to generate a composite image CIMG that displays the entirety of the laser machining region 2M. FIG. 12 shows an example of the composite image CIMG. When the camera 12 is a single wide-angle camera and can photograph the entirety of the laser machining region 2M, step S62 may be omitted. More specifically, in step S62, the computer 4 executes an instruction of the image processing program 54 to combine a plurality of corrected images and generate a composite image displaying the entirety of the laser machining region 2M. That is, the processor 40 executes a process of combining a plurality of corrected images and generating a composite image CIMG that displays the entirety of the laser machining region 2M. Therefore, the image processing program 54 includes a program code of a well-known image stitching algorithm. The program code may be a library called from the image processing program 54.

In FIG. 12, since the composite image CIMG has been subjected to lens aberration correction and trapezoidal correction, the inter-pixel distance in the vertical direction and the inter-pixel distance in the horizontal direction in the composite image CIMG both correspond to unit lengths in the laser machining region 2M. The horizontal direction of the composite image CIMG corresponds to the X direction of the laser machining region 2M, and the vertical direction of the composite image CIMG corresponds to the Y direction of the laser machining region 2M.

In step S63, it is determined whether to select a partial area in the composite image CIMG. This determination is made based on the presence or absence of an input for selecting an area via the touch panel of the numerical control apparatus 8 or the input interface of the computer 4. If there is an area selection (Yes in step S63), in step S64, the selected area SA in the composite image CIMG is set based on the input. This setting is also performed via the touch panel of the numerical control apparatus 8 or the input interface of the computer 4. This area selection is performed at the discretion of the user when there is a high possibility that the sheet metal support member 35 (at least one additional sheet metal support member 36) will be brightly displayed in the composite image CIMG, for example, immediately after the sheet metal support member 35 (at least one additional sheet metal support member 36) is replaced with a new one. FIG. 12 shows the selected area SA as an area surrounded by a white dotted line.

More specifically, in steps S63 and S64, it is determined whether or not there is an input of area selection via the touch panel of the numerical control apparatus 8 or the input interface of the computer 4, and when there is an input, the computer 4 executes an instruction of the image processing program 54 to set the selected area SA based on the input. That is, the processor 40 executes a process of determining whether there is an input of area selection via the touch panel of the numerical control apparatus 8 or the input interface of the computer 4. Therefore, when the touch panel of the numerical control apparatus 8 is operated in the execution of the machining program 90, the processor 80 of the numerical control apparatus 8 may execute a process of transmitting the operation information to the processor 40 executing the image processing program 54 via the communication circuit 84, the network 6, and the communication circuit 44.

When the process of step S64 is completed, a process of binarizing the selected area SA in the composite image CIMG is executed in step S65. More specifically, the computer 4 executes an instruction of the image processing program 54 to binarize the selected area SA in the composite image CIMG. That is, the processor 40 executes a process of binarizing the selected area SA in the composite image CIMG. In other words, the above-described bright region is detected by binarizing the image IMG (IMGa, IMGb). Therefore, the image processing program 54 includes a program code of a well-known binarization algorithm. The program code may be a library called from the image processing program 54. When there is no area selection in step S63 (No in step S63), step S65 is executed for the entire composite image CIMG.

Figure 13:
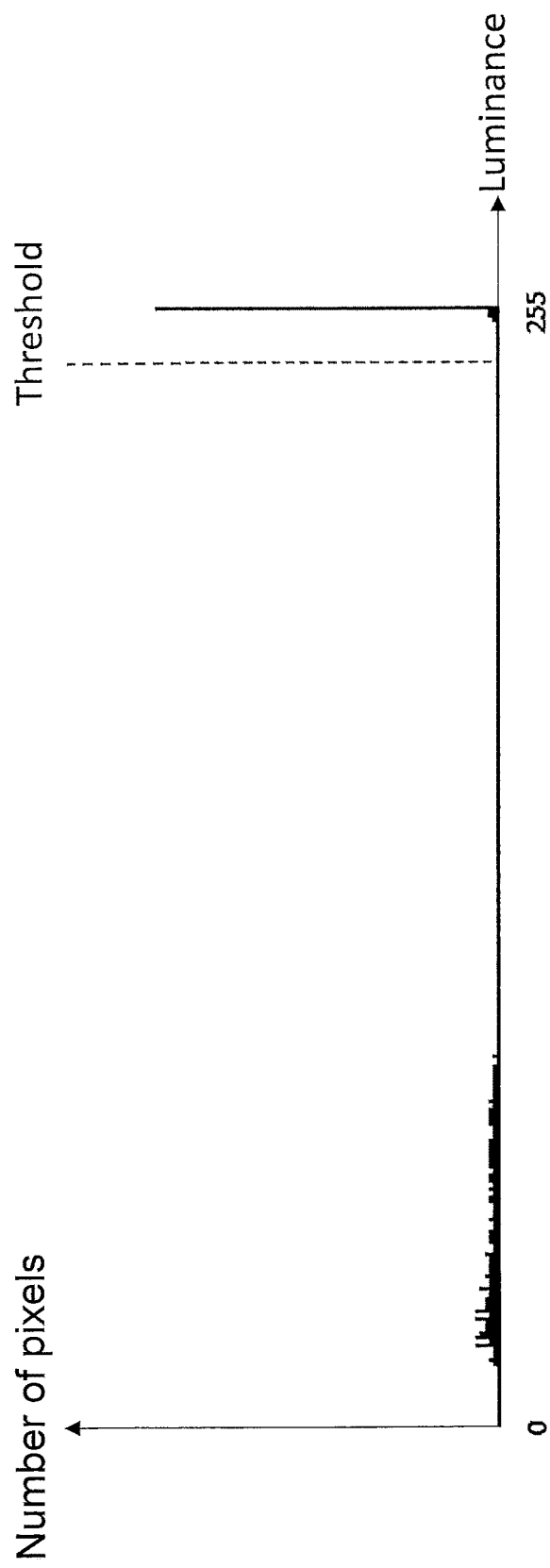
FIG. 13 shows a histogram of the luminance of the selected area SA of FIG. 12.

Binarization is performed based on a threshold value of luminance when an image is converted into a gray scale. FIG. 13 shows a histogram of the luminance of the selected area SA of FIG. 12. The value of the horizontal axis in FIG. 13 indicates a value obtained by normalizing the luminance from 0 to 255, and the value of the vertical axis in FIG. 14 indicates the number of pixels corresponding to the luminance. In the present embodiment, as shown in FIG. 2, by arranging the illuminator 14 for illuminating the sheet metal MP on a side opposite to the cameras 12 (12a, 12b) with respect to the laser machining region 2M, the region of the front side of the sheet metal MP becomes blown-out highlight in the images IMG (IMGa, IMGb). The aperture and the exposure time of the cameras 12 (12a and 12b) are set in advance, and the illuminance and the arrangement of the illuminator 14 are adjusted in advance, so that the surfaces of the sheet metal MP are blown-out highlight no matter where the sheet metal MP is arranged in the laser machining region 2M. Therefore, most of the area of the sheet metal MP has the maximum value (255). As shown in FIG. 12, in the images IMG (IMGa, IMGb), the side surfaces of sheet metal support member 35 (at least one additional sheet metal support member 36) are also brightly displayed by illuminator 14 (additional illuminator 16), and therefore, in order to suppress erroneous recognition of sheet metal support member 35 (at least one additional sheet metal support member 36) as the surface of sheet metal MP, the threshold value is desirably near the maximum value of luminance. As shown in FIG. 13, when the surface of the sheet metal MP and the remaining area are largely divided into two areas, a valley of the histogram may be determined as the threshold.

Figure 14:
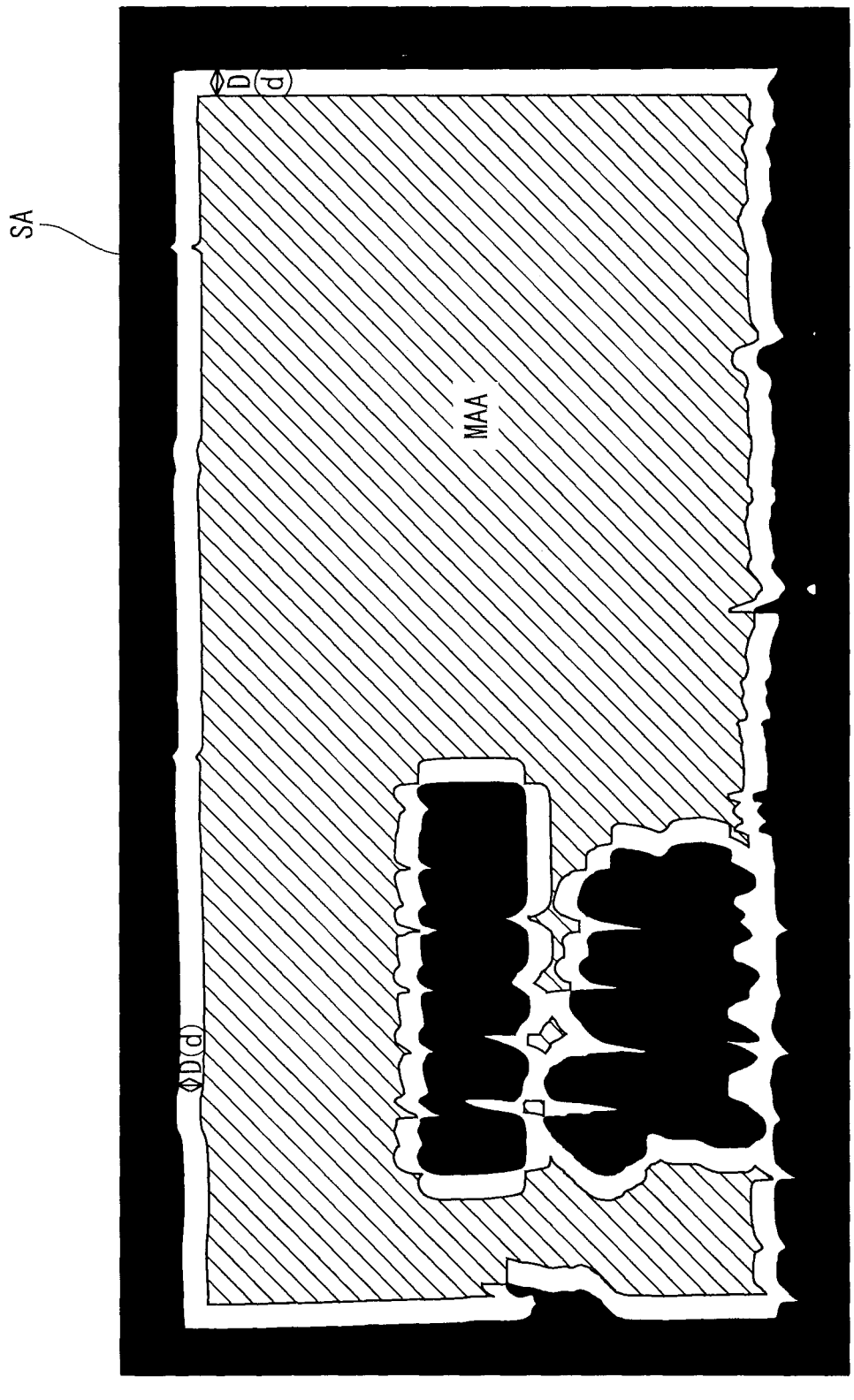
FIG. 14 shows an example of a binarized image of the selected area SA of FIG. 12.

FIG. 14 shows a binarized image when the threshold is determined in this way. In FIG. 14, a region displayed in white is a portion recognized as a bright region in FIG. 12, and a region displayed in black is a portion recognized as a dark region in FIG. 12. Similarly to the composite image CIMG, the inter-pixel distance in the vertical direction and the inter-pixel distance in the horizontal direction of the binarized image both correspond to unit lengths in the laser machining region 2M. Therefore, the distances in the X direction and the Y direction of two points in the laser machining region 2M corresponding to arbitrary two points displayed in the binarized image can be calculated by multiplying the numbers of pixels in the horizontal direction and the vertical direction between the two points by proportionality constants determined from the camera parameters 60. Therefore, in FIG. 14, the distance represented by the number of pixels and the actual distance of the laser machining region 2M corresponding thereto are displayed in a mixed manner.

Here, when the laser machining is performed in the boundary portion of the dark region, the laser machining is easily affected by the recognition error and the distortion of the sheet metal MP. Therefore, in step S66, a region obtained by removing a portion within the clearance amount D(d) from the boundary with the dark region in the bright region of the corrected image (composite image CIMG) is detected as the machining available area MAA. More specifically, the computer 4 executes an instruction of the image processing program 54 to detect, as the machining available area MAA, a region obtained by removing a portion within the clearance amount D(d) from the boundary with the dark region in the bright region of the corrected image (composite image CIMG). That is, the processor 40 executes a process of detecting, as a machining available area, a region obtained by removing a portion within the clearance amount D (d) from the boundary with the dark region in the bright region of the corrected image (composite image CIMG).

In the removal of the clearance amount, the processor 40 executes a process of calculating, based on the camera parameters 60, positions in the XYZ coordinate space (positions represented by XYZ coordinates) corresponding to a plurality of pixels forming the boundary between the bright region and the dark region in the binarized image (hereinafter, referred to as boundary pixels) from positions of the plurality of boundary pixels in the binarized image. The processor 40 executes a process of obtaining a set of separation points separated by the clearance amount D (length in the XYZ coordinate space) in both the X direction and the Y direction from each of the positions of the plurality of boundary pixels in the XYZ coordinate space, and obtaining a contour line of the machining available area MAA by connecting adjacent separation points by a line. Adjacent separation points may be smoothly connected by a spline curve, a Bezier curve, or the like, or may be linearly connected. Instead of the above, the processor 40 may calculate the clearance amount d by converting the clearance amount D represented by the length in the XYZ coordinate space into the number of pixels of the binarized image and perform the above processing in the binarized image.

Here, the distance D corresponding to the clearance amount in the laser machining region 2M is greater than the width Lt of the sheet metal support member 35 (at least one additional sheet metal support member 36). This prevents the sheet metal support member 35 (at least one additional sheet metal support member 36) from being erroneously machined. Further, preferably, the distance D corresponding to the clearance amount in the laser machining region 2M is longer than a half of the distance Lg in the second direction (X direction) between two closest members of the sheet metal support member 35 and the at least one additional sheet metal support member 36. Thus, erroneous detection of the side surface 341*f* (351*f*, 361*f*) of the elongated projections 34 (the sheet metal support member 35 and the at least one additional sheet metal support member 36) brightly illuminated by the illuminator 14 (the additional illuminator 16) is suppressed. The above is the detailed operation of step S6.

Referring back to FIG. 8, next, in step S7, data (product data 56) defining the shape of a product to be obtained by machining the sheet metal MP with the laser machining apparatus 2 is acquired. In other words, the computer 4 executes an instruction of the nesting program 58 to acquire data (product data 56) defining a shape of a product to be obtained by machining the sheet metal MP with the laser machining apparatus 2. That is, the processor 40 executes a process of acquiring, from the memory 42, data (product data 56) defining the shape of a product to be obtained by machining the sheet metal MP with the laser machining apparatus 2. The product data 56 may be data defining the shapes of a plurality of products. More specifically, a product is selected by the user, and a target quantity of the selected products is input via the touch panel of the numerical control apparatus 8 or the input interface of the computer 4. Data defining the shape of the product selected by the user is acquired as product data 56, and the target quantity is also acquired. In a case where the maximum number of selected products are allocated in the machining available area MAA, the input and acquisition of the target quantity may be omitted.

Figure 15:
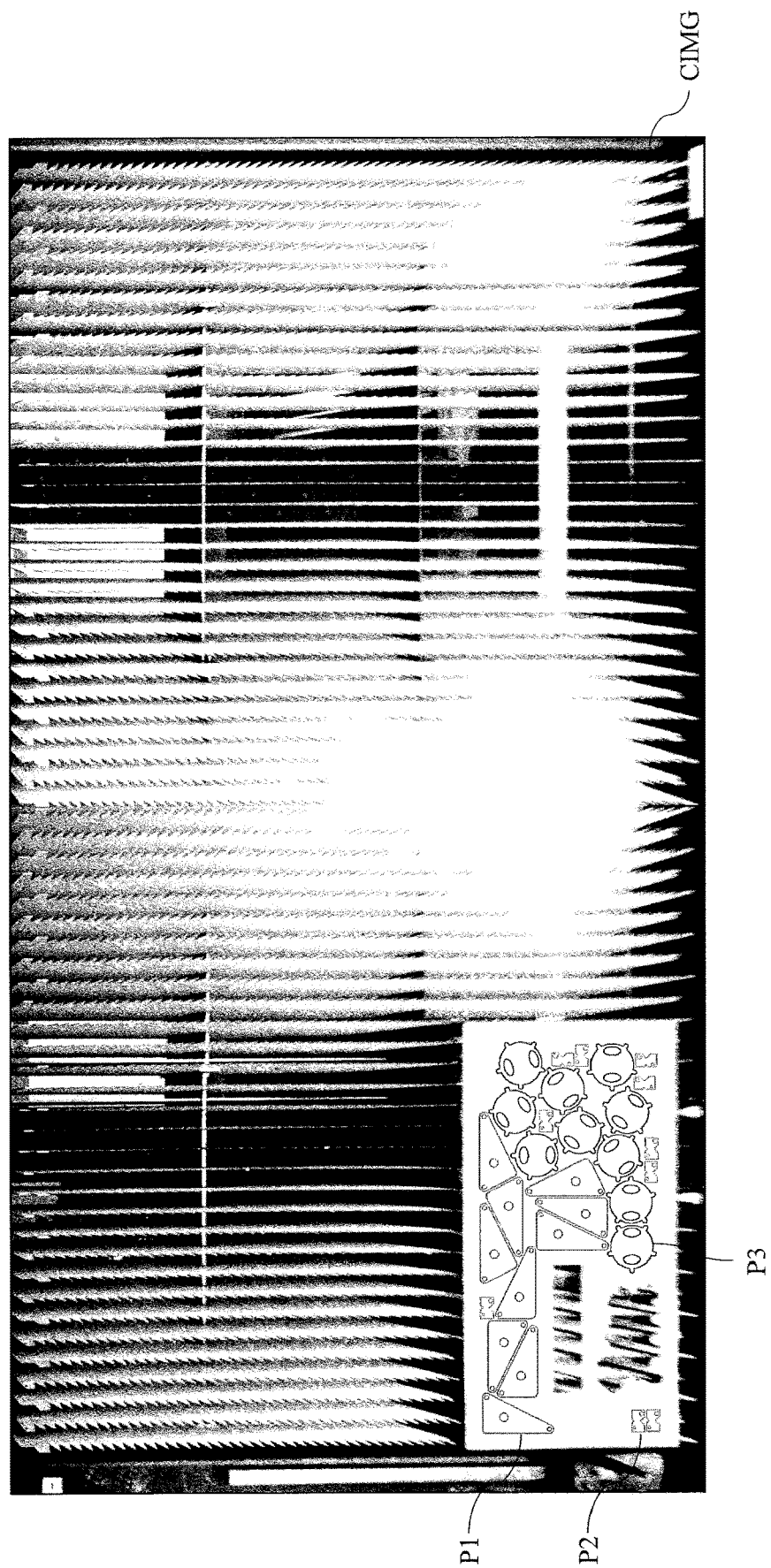
FIG. 15 shows an example of an image in which a nesting processing result is superimposed on a composite image.

In step S8, a region corresponding to the shape is allocated in the machining available area. More specifically, the computer 4 executes an instruction of the nesting program 58 to allocate an area corresponding to the shape in the machining available area MAA. That is, the processor 40 executes a process of allocating the machining available area MAA to the regions corresponding to the shape. This process is commonly referred to as nesting. Although any known nesting algorithm may be used as the nesting algorithm, it is desirable to use a search algorithm that reduces the amount of waste as much as possible and packs the target amount of the products by rotating the shape while securing a necessary minimum margin between the products in the machining available area MAA having a free shape. FIG. 15 illustrates an example of an image in which a nesting processing result obtained by allocating the machining available area MAA to regions of three types of products P1 to P3 is superimposed on the composite image CIMG.

Finally, in step S9, the sheet metal MP is machined based on the nesting processing result. More specifically, the nesting processing result is transmitted as the machining region data 92 from the computer 4 to the numerical control apparatus 8 via the network 6, and an image as shown in FIG. 15 is displayed on the touch panel-equipped display 86 of the numerical control apparatus 8. When the start of laser machining is input by the touch panel after the user confirms the image, the laser machining apparatus 2 machines the sheet metal MP according to the machining region data 92.

Modification of the Laser Machining Apparatus 2

Figure 16:
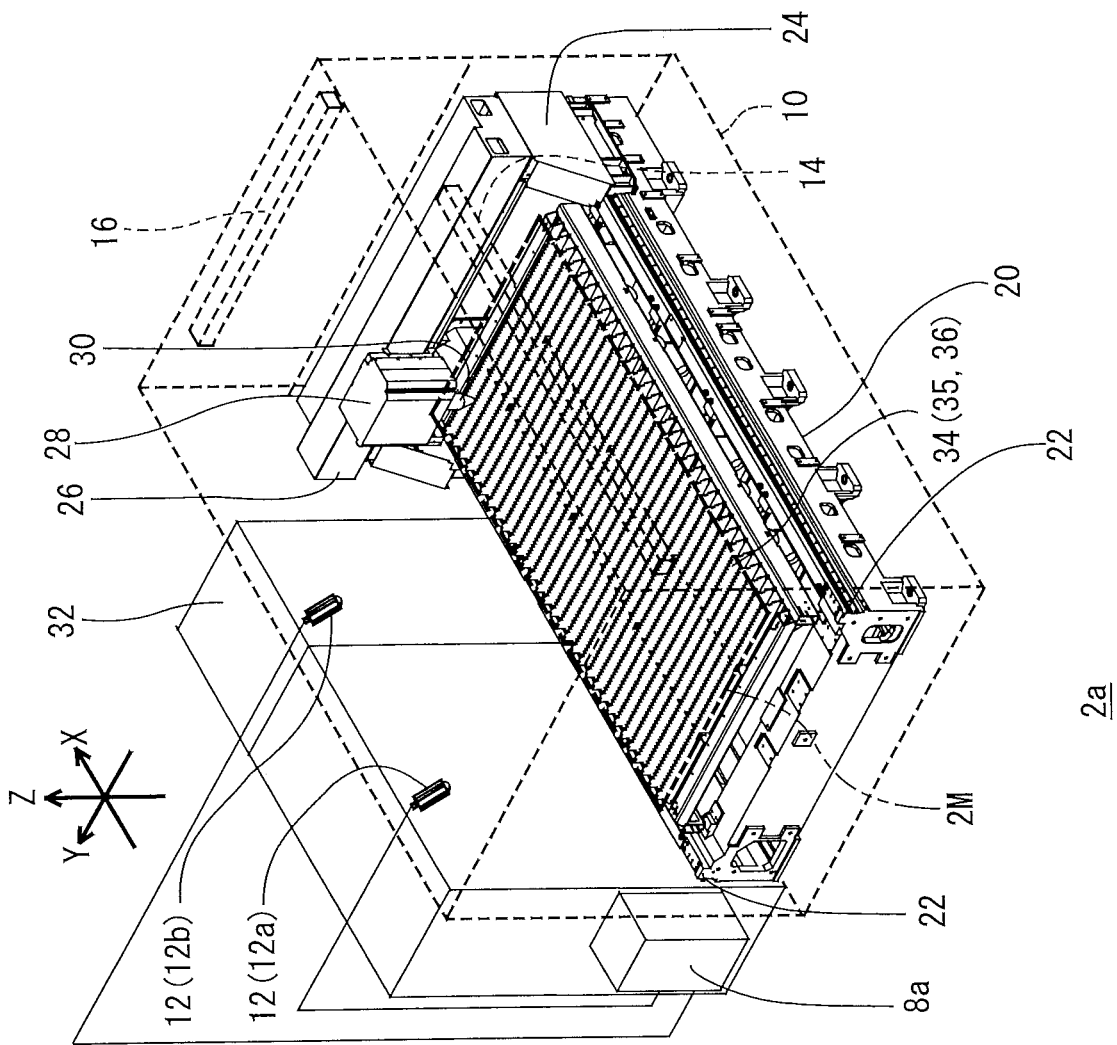
FIG. 16 shows a modification of the laser machining apparatus.
Figure 17:
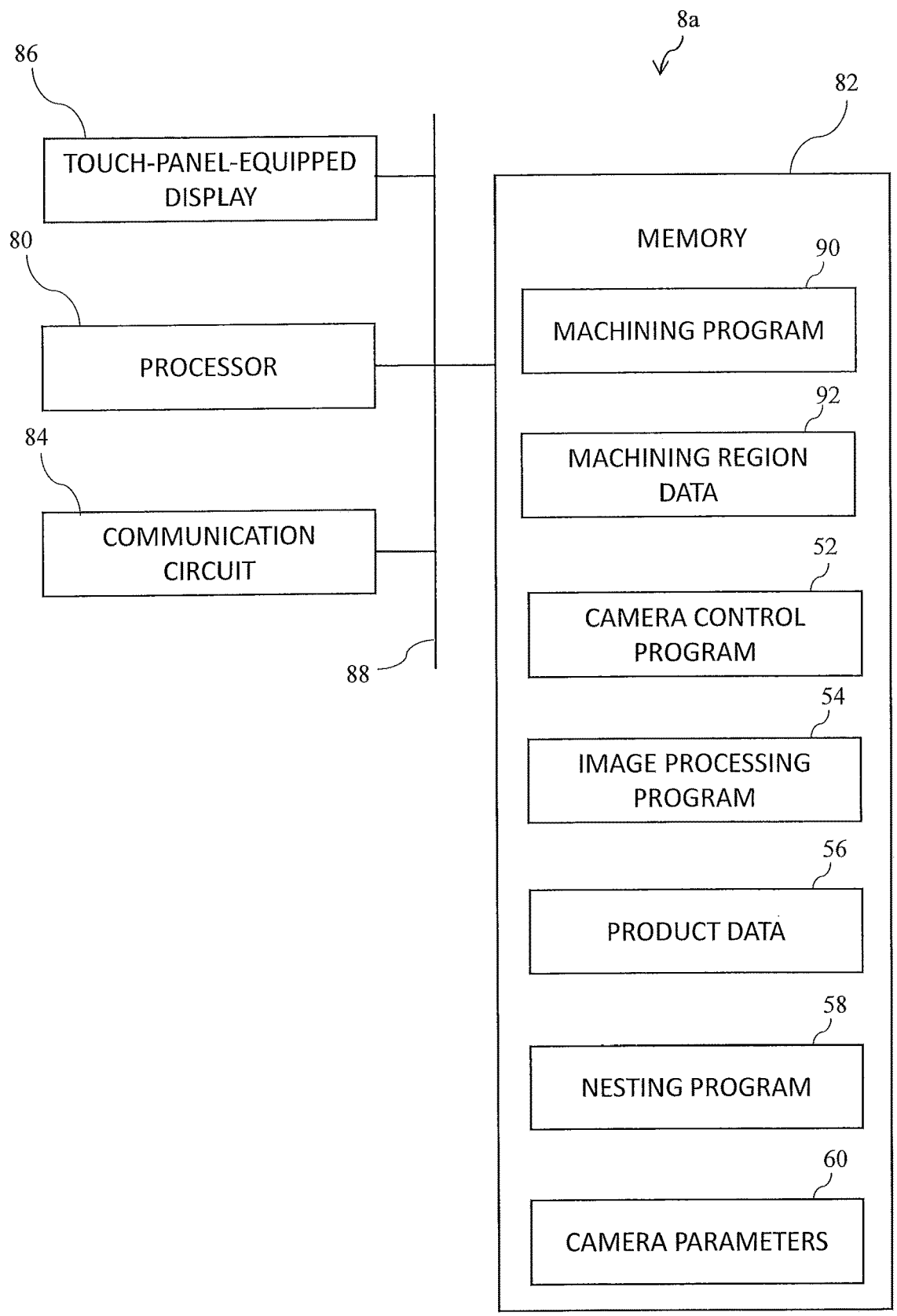
FIG. 17 is a hardware block diagram of a numerical control apparatus according to a modification.

The basic explanation of the laser machining apparatus 2 has been described above. The laser machining apparatus 2 is not limited to that described in the above embodiment. As shown in FIG. 16, the laser machining apparatus 2*a* may include an exterior panel 10, cameras 12 (12*a* and 12*b*), and an illuminator 14 (additional illuminator 16). The numerical control apparatus 8*a* of the laser machining apparatus 2*a* may include all the functions of the computer 4. A block diagram of such a numerical control apparatus 8*a* is shown in FIG. 17. In the present modification, the camera 12 (12*a*, 12*b*) may directly transmit the captured image to the numerical control apparatus 8*a*. In the present modification, the processor 80 may execute the processing of the processor 40 in the flowcharts of FIGS. 8 and 11.

In the sheet metal working system 1 and the laser machining apparatus 2*a*, the nesting program 58 may be omitted. Alternatively, the nesting program 58 may be replaced with a program in which the user manually allocates a region corresponding to the shape of the product in the machining available area MAA. The sheet metal working system 1 (numerical control apparatus 8*a*, nesting program 58) may allow a user to select a region allocated for products. In this case, the sheet metal working system 1 (numerical control device 8*a*) may be configured to enable the area selection as in step S63 again in the binarized image.

In the flowchart of FIG. 11, steps S63 and S64 may be omitted. In this case, the processing in the case of No in step S63 may be executed in step S65. In FIG. 8, steps S7 to S9 may be omitted.

A part or all of the functions of the camera control program 52, the image processing program 54, and the nesting program 58 may be realized by a dedicated image processor or an integrated circuit. For example, the lens aberration correction algorithm, the keystone correction algorithm, the image stitching algorithm, and the binarization algorithm may be implemented in a dedicated image processor, and the nesting algorithm may be implemented in an integrated circuit.

The camera control program 52, program, image processing program 54, and nesting program 58 are not limited to the memory 42 built in the computer 4, and may be recorded in a storage medium that is removable from the computer 4 (numerical control apparatus 8*a*) and readable by the computer 4 (numerical control apparatus 8*a*), such as a disk, an SD-card, a USB-memory, or an external hard disk, the disk including a floppy disk, an optical disk, a CD-ROM, a magnetic disk, and the like.

Advantageous Effect of the Embodiment

In the sheet metal working system 1 and the laser machining apparatus 2*a* according to the present embodiment, the sheet metal support member 35 (at least one additional sheet metal support member 36) is displayed in a small size in the image, and the possibility that the sheet metal support member 35 (at least one additional sheet metal support member 36) is detected as a bright region is reduced. Therefore, even when the sheet metal support member 35 (at least one additional sheet metal support member 36) is photographed, the shape and dimensions of the sheet metal MP to be machined can be recognized from the photographed image.

More specifically, according to a first aspect of the present disclosure, a sheet metal working system includes: a laser machining apparatus to machine a sheet metal in a laser machining region; a camera configured to photograph the laser machining region; an illuminator to illuminate the sheet metal, and a processor configured to process an image captured by the camera. The laser machining apparatus includes a sheet metal support member having a plate-shape, the sheet metal support member having a plurality of protrusions arranged in a first direction in a laser machining region. The sheet metal is disposed on the plurality of protrusions. The camera is arranged such that the optical axis of the camera is oriented substantially parallel to the first direction when viewed in the height direction of the laser machining apparatus. The processor is to detect a bright region in the image as a machining available area of the sheet metal.

According to a second aspect of the present disclosure, a laser machining apparatus includes: a laser head to work a sheet metal in a laser machining region; a sheet metal support member having a plate-shape, the sheet metal support member having a plurality of protrusions arranged in a first direction in the laser machining region, a camera to photograph the laser machining region, an illuminator to illuminate the sheet metal, and a processor configured to process an image photographed by the camera. The sheet metal is disposed on the plurality of protrusions. The camera is arranged such that the optical axis of the camera is oriented substantially parallel to the first direction when viewed in the height direction of the laser machining apparatus. The processor is to execute a process to detect a bright region in the image as a machining available area of the sheet metal.

A sheet metal working method according to a third aspect of the present disclosure includes: mounting a sheet metal support member having a plate-shape, the sheet metal support member having a plurality of protrusions arranged in a first direction in a laser machining region to a laser machining apparatus; arranging a camera to photograph the laser machining region such that an optical axis of the camera is substantially parallel to the first direction when viewed in a height direction of the laser machining apparatus; disposing a sheet metal on the plurality of protrusions in the laser machining region; illuminating the sheet metal by an illuminator; acquiring an image captured by the camera; and detecting a bright region in the image as a machining available area of the sheet metal.

According to a fourth aspect of the present disclosure, a machining region setting program for laser machining, the program causing a computer to execute a process comprising: acquiring an image of a sheet metal mounted on a plurality of protrusions, the sheet metal being illuminated by an illuminator, the image being captured by a camera that is arranged such that an optical axis of the camera is substantially parallel to a first direction when viewed in a height direction of the laser machining apparatus, the plurality of protrusions being arranged in the first direction; and detecting a bright region in the image as a machining available area of the sheet metal.

According to a fifth aspect of the present disclosure, the sheet metal working system according to the first aspect is configured such that a region of a surface of the sheet metal is blown-out-highlight in the image. According to a sixth aspect of the present disclosure, the laser machining apparatus according to the second aspect is configured such that a region of a surface of the sheet metal is blown-out-highlight in the image. According to a seventh aspect of the present disclosure, in the sheet metal working method according to the third aspect, a region of a surface of the sheet metal in the image is blown-out-highlight in the image. According to an eighth aspect of the present disclosure, in the machining region setting program according to the fourth aspect, a region of a surface of the sheet metal is blown-out-highlight in the image.

According to a ninth aspect of the present disclosure, the sheet metal working system according to the first aspect or the fifth aspect is configured such that the bright region is detected by binarizing the image. According to a tenth aspect of the present disclosure, the laser machining apparatus according to the second aspect or the sixth aspect is configured such that the bright region is detected by binarizing the image. According to a eleventh aspect of the present disclosure, in the sheet metal working method according to the third aspect or the seventh aspect, the bright region is detected by binarizing the image. According to a twelfth aspect of the present disclosure, in the machining region setting program according to the fourth aspect or the eighth aspect, the bright region is detected by binarizing the image.

According to a thirteenth aspect of the present disclosure, the sheet metal working system according to any one of the first, fifth, and ninth aspects is configured such that a width of the sheet metal support member in a second direction perpendicular to the first direction and the height direction is shorter than a length of the sheet metal support member in the second direction and a length of the sheet metal support member in the height direction. According to a fourteenth aspect of the present disclosure, the laser machining apparatus according to any one of the second, sixth, and tenth aspects is configured such that a width of the sheet metal support member in a second direction perpendicular to the first direction and the height direction is shorter than a length of the sheet metal support member in the first direction and a length of the sheet metal support member in the height direction. According to a fifteenth aspect of the present disclosure, in the sheet metal working method according to any one of the third, seventh, and eleventh aspects, a width of the sheet metal support member in a second direction perpendicular to the first direction and the height direction is shorter than a length of the sheet metal support member in the first direction and a length of the sheet metal support member in the height direction. According to a sixteenth aspect of the present disclosure, in the machining region setting program according to any one of the fourth, eighth, and twelfth aspects, a width of the sheet metal support member in a second direction perpendicular to the first direction and the height direction is shorter than a length of the sheet metal support member in the first direction and a length of the sheet metal support member in the height direction.

According to a seventeenth aspect of the present disclosure, the sheet metal working system according to the thirteenth aspect further includes at least one additional sheet metal support member having a substantially same shape as a shape of the sheet metal support member, wherein the sheet metal support member and the at least one additional sheet metal support member are arranged in the second direction. According to an eighteenth aspect of the present disclosure, the laser machining apparatus according to the fourteenth aspect further includes at least one additional sheet metal support member having a substantially same shape as a shape of the sheet metal support member, wherein the sheet metal support member and the at least one additional sheet metal support member are arranged in the second direction. According to a nineteenth aspect of the present disclosure, the sheet metal working method according to the fifteenth aspect further includes mounting at least one additional sheet metal support member having a substantially same shape as a shape of the sheet metal support member such that the sheet metal support member and the at least one additional sheet metal support member are arranged in the second direction. According to a twentieth aspect of the present disclosure, in the machining region setting program according to the sixteenth aspect, the laser machining apparatus further includes at least one additional sheet metal support member having a substantially same shape as the sheet metal support member and arranged in the second direction with respect to the sheet metal support member.

According to a twenty-first aspect of the present disclosure, the sheet metal working system according to the seventeenth aspect is configured such that a distance in the second direction between two closest members of the sheet metal support member and the at least one additional sheet metal support member is greater than 20 times the width. According to a twenty-second aspect of the present disclosure, the laser machining apparatus according to the eighteenth aspect is configured such that a distance in the second direction between two closest members of the sheet metal support member and the at least one additional sheet metal support member is greater than 20 times the width. According to a twenty-third aspect of the present disclosure, in the sheet metal working method according to the nineteenth aspect, a distance in the second direction between two closest members of the sheet metal support member and the at least one additional sheet metal support member is longer than 20 times the width. According to a twenty-fourth aspect of the present disclosure, in the machining region setting program according to the twentieth aspect, a distance in the second direction between two closest members of the sheet metal support member and the at least one additional sheet metal support member is greater than 20 times the width.

According to a twenty-fifth aspect of the present disclosure, the sheet metal working system according to any one of the first, fifth, ninth, thirteenth, seventeenth, and twenty-first aspects further includes an exterior panel covering the laser machining apparatus, the camera, and the illuminator. According to a twenty-sixth aspect of the present disclosure, the laser machining apparatus according to any one of the second, sixth, tenth, fourteenth, eighteenth, and twenty-second aspects further includes an exterior panel covering the laser machining apparatus, the camera, and the illuminator. According to a twenty-seventh aspect of the present disclosure, the sheet metal working method according to any of the third, seventh, eleventh, fifteenth, nineteenth, and twenty-third aspects further includes covering the laser machining apparatus, the camera, and the illuminator with an exterior panel. According to a twenty-eighth aspect of the present disclosure, in the machining region setting program according to any one of the fourth, eighth, twelfth, twentieth, and twenty-fourth aspects, the laser beam machine, the camera, and the illuminator are covered with an exterior panel.

According to a twenty-ninth aspect of the present disclosure, the sheet metal working system according to the twenty-fifth aspect is configured such that the camera is disposed at a position where the camera does not overlap with the laser machining region when viewed in the height direction, and the optical axis is directed toward a central portion of the laser machining region in the first direction. According to a thirtieth aspect of the present disclosure, the laser machining apparatus according to the twenty-sixth aspect is configured such that the camera is disposed at a position where the camera does not overlap with the laser machining region when viewed in the height direction, and the optical axis is directed toward a central portion of the laser machining region in the first direction. According to a thirty-first aspect of the present disclosure, in the sheet metal working method according to the twenty-seventh aspect, the camera is disposed at a position where the camera does not overlap the laser machining region when viewed in the height direction, and the optical axis is directed toward a central portion of the laser machining region in the first direction. According to a thirty-second aspect of the present disclosure, in the machining region setting program according to the twenty-eighth aspect, the camera is disposed at a position that does not overlap the laser machining region when viewed from the height direction, and the optical axis is directed toward a central portion of the laser machining region in the first direction.

According to a thirty-third aspect of the present disclosure, the sheet metal working system according to the twenty-ninth aspect is configured such that the illuminator is disposed on an opposite side of the camera with respect to the laser machining region when viewed in the height direction. According to a thirty-fourth aspect of the present disclosure, the laser machining apparatus according to the thirtieth aspect is configured such that the illuminator is disposed on a side opposite to the camera with respect to the laser machining region when viewed in the height direction. According to a thirty-fifth aspect of the present disclosure, in the sheet metal working method according to the thirty-first aspect, the illuminator is disposed on a side opposite to the camera with respect to the laser machining region when viewed in the height direction. According to a thirty-sixth aspect of the present disclosure, in the machining region setting program according to the thirty-second aspect, the illuminator is arranged on a side opposite to the camera with respect to the laser machining region when viewed from the height direction.

According to a thirty-seventh aspect of the present disclosure, in the sheet metal working system according to any one of the first, fifth, ninth, thirteenth, seventeenth, twenty-first, twenty-fifth, twenty-ninth, and thirty-third aspects, the processor is configured to execute processes comprising: generating a corrected image by performing keystone correction on the image; and detecting, as a machining available area, a region obtained by removing, from the bright region of the corrected image, a portion provided within a clearance amount from a boundary with a dark region. According to a thirty-eighth aspect of the present disclosure, in the laser machining apparatus according to any one of the second, sixth, tenth, fourteenth, eighteenth, twenty-second, twenty-sixth, thirtieth, and thirty-fourth aspects, the processor is configured to execute processes comprising: generating a corrected image obtained by performing keystone correction on an image; and detecting, as a machining available area, a region obtained by removing, from the bright region of the corrected image, a portion within a clearance amount from a boundary with a dark region. According to a thirty-ninth aspect of the present disclosure, the sheet metal working method according to any one of the third, seventh, eleventh, fifteenth, nineteenth, twenty-third, twenty-seventh, thirty-first, and thirty-fifth aspects further includes generating a corrected image obtained by performing keystone correction on the image, wherein a region obtained by removing, from the bright region of the corrected image, a portion provided within a clearance amount from a boundary is detected as a machining available area. According to a fortieth aspect of the present disclosure, the machining region setting program according to any one of the fourth, eighth, twelfth, sixteenth, twentieth, twenty-fourth, twenty-eighth, thirty-second, and thirty-sixth aspects causes the computer further to execute a process of generating a corrected image obtained by performing keystone correction on the image, wherein as a machining available area, an area obtained by removing, from a bright region of the corrected image, a portion provided within a clearance amount from a boundary with a dark region.

According to a forty-first aspect of the present disclosure, the sheet metal working system according to the thirty-seventh aspect is configured such that a length corresponding to the clearance amount in the laser machining region is larger than a width of the sheet metal support member in a second direction perpendicular to the first direction and the height direction. According to a forty-second aspect of the present disclosure, the laser machining apparatus according to the thirty-eighth aspect is configured such that a length corresponding to the clearance amount in the laser machining region is larger than a width of the sheet metal support member in a second direction perpendicular to the first direction and the height direction. According to a forty-third aspect of the present disclosure, in the sheet metal working method according to the thirty-ninth aspect, a length corresponding to a clearance amount in the laser machining region is larger than a width of the sheet metal support member in a second direction perpendicular to the first direction and the height direction. According to a forty-fourth aspect of the present disclosure, in the machining region setting program according to the fortieth aspect, a length corresponding to a clearance amount in the laser machining region is larger than a width of the sheet metal support member in a second direction perpendicular to the first direction and the height direction.

According to a forty-fifth aspect of the present disclosure, the sheet metal working system according to any one of the first, fifth, ninth, thirteenth, seventeenth, twenty-first, twenty-fifth, twenty-ninth, thirty-third, thirty-seventh, and forty-first aspects further includes a memory to store data defining a shape of a product into which the sheet metal is made with machining by the laser machining apparatus, and the processor is configured to execute a process of allocating an area corresponding to the shape in the processable area. According to a forty-sixth aspect of the present disclosure, the laser machining apparatus according to any one of the second, sixth, tenth, fourteenth, eighteenth, twenty-second, twenty-sixth, thirtieth, thirty-fourth, thirty-eighth, and forty-second aspects further includes a memory to store data defining a shape of a product into which the sheet metal is made with machining by the laser machining apparatus, wherein the processor is configured to execute a process of allocating an area corresponding to the shape in the processable area. According to a forty-seventh aspect of the present disclosure, the sheet metal working method according to the third, seventh, eleventh, fifteenth, nineteenth, twenty-third, twenty-seventh, thirty-first, thirty-fifth, thirty-ninth, and forty-third aspects further includes acquiring data defining a shape of a product into which the sheet metal is made with machining by the laser machining apparatus, and allocating a region corresponding to the shape in the machining available area. According to a forty-eighth aspect of the present disclosure, the machining region setting program according to the fourth, eighth, twelfth, sixteenth, twentieth, twenty-fourth, twenty-eighth, thirty-second, thirty-sixth, fortieth, and forty-fourth aspects causes the computer further to execute a process of acquiring data defining a shape of a product into which the sheet metal is made with machining by the laser machining apparatus and allocating a region corresponding to the shape in the machining available area. The machining region setting program according to the forty-eighth aspect may be referred to as a machining region allocation program for laser machining.

In the sheet metal working system according to the first aspect, the laser machining apparatus according to the second aspect, the sheet metal working method according to the third aspect, and the machining region setting program for laser machining according to the fourth aspect, the sheet metal support member is displayed in a small size in the image, and the possibility that the sheet metal support member is detected as a bright region is reduced. Therefore, even if the sheet metal support member is photographed, the shape and dimensions of the sheet metal to be machined can be recognized from the photographed image.

In the sheet metal working system according to the fifth aspect, the laser machining apparatus according to the sixth aspect, the sheet metal working method according to the seventh aspect, and the machining region setting program for laser machining according to the eighth aspect, it is easy to distinguish the region of the surface of the sheet metal from the other region in the image. Therefore, the detection accuracy of the machining available area of the sheet metal can be further increased.

In the sheet metal working system according to the ninth aspect, the laser machining apparatus according to the tenth aspect, the sheet metal working method according to the eleventh aspect, and the machining region setting program for laser machining according to the twelfth aspect, the bright region can be determined by the binarization algorithm.

In the sheet metal working system according to the thirteenth aspect, the laser machining apparatus according to the fourteenth aspect, the sheet metal working method according to the fifteenth aspect, and the machining region setting program for laser machining according to the sixteenth aspect, the upper surface of the sheet metal support member that is likely to be determined as the bright region due to reflection by illuminator is displayed in a small size in the image. Therefore, the area occupied by the sheet metal support member in the bright region can be further reduced.

In the sheet metal working system according to the seventeenth aspect, the laser machining apparatus according to the eighteenth aspect, the sheet metal working method according to the nineteenth aspect, and the machining region setting program for laser machining according to the twentieth aspect, not only the sheet metal is stably supported by the sheet metal support member and the at least one additional sheet metal support member, but also the sheet metal conveying device is disposed between the sheet metal support member and the at least one additional sheet metal support member, so that the sheet metal can be easily carried into and out of the laser machining apparatus.

In the sheet metal working system according to the twenty-first aspect, the laser machining apparatus according to the twenty-second aspect, the sheet metal working method according to the twenty-third aspect, and the machining region setting program for laser machining according to the twenty-fourth aspect, the sheet metal support member and the at least one additional sheet metal support member are disposed so as to be largely separated from each other compared to the width of the sheet metal support member and the width of the at least one additional sheet metal support member. Therefore, it is possible to reduce the possibility that the sheet metal support member and the at least one additional sheet metal support member overlap and are displayed in a large size in the bright region due to the regions of the upper surface of the sheet metal support member and the upper surfaces of the at least one additional sheet metal support member approaching each other in the image. Therefore, the detection accuracy of the machining available area of the sheet metal can be increased.

In the sheet metal working system according to the twenty-fifth aspect, the laser machining apparatus according to the twenty-sixth aspect, the sheet metal working method according to the twenty-seventh aspect, and the machining region setting program for laser machining according to the twenty-eighth aspect, the exterior panel prevents ambient light from entering the laser machining region. Therefore, the detection accuracy of the machining available area of the sheet metal can be further increased.

In the sheet metal working system according to the twenty-ninth aspect, the laser machining apparatus according to the thirtieth aspect, the sheet metal working method according to the thirty-first aspect, and the machining region setting program for laser machining according to the thirty-second aspect, the camera does not interfere with the movement of the laser head regardless of the height of the camera. Therefore, the camera can be disposed low in the exterior panel, and the area covered by the exterior panel can be reduced.

In the sheet metal working system according to the thirty-third aspect, the laser machining apparatus according to the thirty-fourth aspect, the sheet metal working method according to the thirty-fifth aspect, and the machining region setting program for laser machining according to the thirty-sixth aspect, since the reflected light obtained by reflecting the light from the illuminator by the sheet metal is incident on the camera, the sheet metal is photographed more brightly by the camera. Therefore, the detection accuracy of the machining available area of the sheet metal can be further increased.

In the sheet metal working system according to the thirty-seventh aspect, the laser machining apparatus according to the thirty-eighth aspect, the sheet metal working method according to the thirty-ninth aspect, and the machining region setting program for laser machining according to the fortieth aspect, since the portion corresponding to the clearance amount in the bright region is removed, it is possible to increase the machining accuracy of the product generated for laser machining. Further, the sheet metal support member is prevented from being erroneously machined.

In the sheet metal working system according to the forty-first aspect, the laser machining apparatus according to the forty-second aspect, the sheet metal working method according to the forty-third aspect, and the machining region setting program for laser machining according to the forty-fourth aspect, since the length corresponding to the clearance amount in the laser machining region is larger than the width of the sheet metal support member, erroneous machining of the sheet metal support member is further suppressed.

In the sheet metal working system according to the forty-fifth aspect, the laser machining apparatus according to the forty-sixth aspect, the sheet metal working method according to the forty-seventh aspect, and the machining region setting program for laser machining (machining region allocation program for laser machining) according to the forty-eighth aspect, since a region corresponding to the shape of the product is automatically allocated in the machining available area, it is possible to reduce the burden of setting for laser machining by the user.

In this application, "comprising" and its derivatives are open-ended terms that describe the presence of elements and do not exclude the presence of other elements not described. This also applies to "having", "including" and derivatives thereof.

The terms " . . . member", " . . . part", " . . . element", " . . . body" and " . . . structure" may have multiple meanings, such as a single part or multiple parts.

Ordinal numbers such as "first" and "second" are merely terms for identifying configurations, and do not have other meanings (for example, a specific order). For example, the presence of a "first element" does not imply that a "second element" is present, and the presence of a "second element" does not imply that a "first element" is present.

Terms such as "substantially", "about", and "approximately" indicating the degree may mean a reasonable amount of deviation such that the final result is not significantly changed unless otherwise specified in the embodiments. All numerical values recited in this application can be construed to include language such as "substantially," "about," and "approximately."

The phrase "at least one of A and B" in this application should be interpreted to include only A, only B, and both A and B.

Obviously, many modifications and variations of the present invention are possible in light of the above teachings. Accordingly, the invention may be practiced otherwise than as specifically disclosed herein without departing from the spirit of the invention.

What is claimed is:

1. A sheet metal working system comprising:
    a laser machining apparatus configured to machine a sheet metal, the laser machining apparatus comprising sheet metal support members each having a plate-shape and each comprising a plurality of protrusions arranged with respect to one another in a first direction, the sheet metal support members being arranged with respect to one another in a second direction perpendicular to the first direction;
    a camera configured to capture an image of the sheet metal support members with the sheet metal disposed on the protrusions of the sheet metal support members, the camera being arranged such that an optical axis of the camera extends in a direction that slants from the first direction toward the sheet metal support members in a height direction perpendicular to the first direction and the second direction;
    an illuminator configured to illuminate the sheet metal and arranged such that a surface of the sheet metal appears as a blown-out highlight in the image no matter where the sheet metal is disposed on the protrusions of the sheet metal support members; and circuitry configured to process the image to detect a bright region in the image as a machining available area of the sheet metal,
wherein the circuitry is configured to:
  generate a corrected image by performing keystone correction on the image; and
  detect, as the machining available area, a region obtained by removing, from the bright region of the corrected image, a portion provided within a clearance amount from a boundary with a dark region, and
wherein the circuitry is configured to control the laser machining apparatus to machine the sheet metal within the machining available area of the sheet metal to form a product machined from the sheet metal based on the bright region detected in the image and based on product data defining a shape of the product.

2. The sheet metal working system according to claim 1, wherein the bright region is detected by binarizing the image.

3. The sheet metal working system according to claim 1, wherein a width of each of the sheet metal support members in the second direction is shorter than a length of the sheet metal support member in the first direction and a length of the sheet metal support member in the height direction.

4. The sheet metal working system according to claim 3, wherein a distance in the second direction between two closest members of the sheet metal support members is greater than 20 times the width.

5. The sheet metal working system according to claim 1, further comprising: an exterior panel covering the laser machining apparatus, the camera, and the illuminator.

6. The sheet metal working system according to claim 5, wherein the camera is disposed at a position such that the camera does not overlap with the sheet metal support members when viewed from the height direction, and the optical axis is directed to a middle of the sheet metal support members in the first direction.

7. The sheet metal working system according to claim 6, wherein the illuminator is disposed on a side opposite to the camera with respect to the sheet metal support members when viewed from the height direction.

8. The sheet metal working system according to claim 1, wherein a length corresponding to the clearance amount in the corrected image is larger than a width of the sheet metal support member in the second direction.

9. The sheet metal working system according to claim 1, further comprising:
  a memory to store data defining the shape of the product into which the sheet metal is made with machining by the laser machining apparatus,
  wherein the circuitry is configured to allocate a region corresponding to the shape of the product in the machining available area.

10. The sheet metal working system according to claim 3, wherein the bright region is detected by binarizing the image.

11. The sheet metal working system according to claim 5, wherein a width of the sheet metal support member in the second direction is shorter than a length of the sheet metal support member in the first direction and a length of the sheet metal support member in the height direction.

12. The sheet metal working system according to claim 1, wherein a width of the sheet metal support member in the second direction is shorter than a length of the sheet metal support member in the first direction and a length of the sheet metal support member in the height direction.

13. A laser machining apparatus comprising:
a laser head configured to machine a sheet metal;
sheet metal support members each having a plate-shape and each comprising protrusions arranged with respect to one another in a first direction, the sheet metal support members being arranged with respect to one another in a second direction perpendicular to the first direction;
a camera configured to capture an image of the sheet metal support members with the sheet metal disposed on the protrusions of the sheet metal support members, the camera being arranged such that an optical axis of the camera extends in a direction that slants from the first direction toward the sheet metal support members in a height direction perpendicular to the first direction and the second direction;
an illuminator configured to illuminate the sheet metal and arranged such that a surface of the sheet metal appears as a blown-out highlight in the image no matter where the sheet metal is disposed on the protrusions of the sheet metal support members; and
circuitry configured to process the image to detect a bright region in the image as a machining available area of the sheet metal,
wherein the circuitry is configured to:
  generate a corrected image by performing keystone correction on the image; and
  detect, as the machining available area, a region obtained by removing, from the bright region of the corrected image, a portion provided within a clearance amount from a boundary with a dark region, and
wherein the circuitry is configured to control the laser machining apparatus to machine the sheet metal within the machining available area of the sheet metal to form a product machined from the sheet metal based on the bright region detected in the image and based on product data defining a shape of the product.

14. A sheet metal working method comprising:
arranging sheet metal support members each having a plate-shape and each comprising protrusions arranged with respect to one another in a first direction, the sheet metal support members being arranged with respect to one another in a second direction perpendicular to the first direction;
disposing a sheet metal on the protrusions of the sheet metal support members;
arranging a camera configured to capture an image of the sheet metal support members with the sheet metal such that an optical axis of the camera extends in a direction that slants from the first direction toward the sheet metal support members in a height direction perpendicular to the first direction and the second direction;
arranging an illuminator such that a surface of the sheet metal to be illuminated by the illuminator appears as a blown-out highlight in the image no matter where the sheet metal is disposed on the protrusions of the sheet metal support members;
detecting a bright region in the image as a machining available area of the sheet metal;
generating a corrected image by performing keystone correction on the image;
detecting, as the machining available area, a region obtained by removing, from the bright region of the corrected image, a portion provided within a clearance amount from a boundary with a dark region, and controlling a laser machining apparatus to machine the sheet metal within the machining available area of the sheet metal to form a product machined from the sheet metal based on the bright region detected in the image and based on product data defining a shape of the product.

15. A non-transitory computer-readable recording medium storing a program for causing a computer to execute a process comprising:

acquiring an image of a sheet metal disposed on protrusions of sheet metal support members mounted on a laser machining apparatus, the protrusions of each of the sheet metal support members being arranged with respect to one another in a first direction, the sheet metal support members being arranged with respect to one another in a second direction perpendicular to the first direction, the image being captured by a camera that is arranged such that an optical axis of the camera extends in a direction that slants from the first direction toward the sheet metal support members in a height direction perpendicular to the first direction and to the second direction, the sheet metal being illuminated by an illuminator arranged such that a surface of the sheet metal appears as a blown-out highlight in the image no matter where the sheet metal is disposed on the protrusions of the sheet metal support members;

detecting a bright region in the image as a machining available area of the sheet metal;

generating a corrected image by performing keystone correction on the image; and detecting, as the machining available area, a region obtained by removing, from the bright region of the corrected image, a portion provided within a clearance amount from a boundary with a dark region; and controlling the laser machining apparatus to machine the sheet metal within the machining available area of the sheet metal to form a product machined from the sheet metal based on the bright region detected in the image and based on product data defining a shape of the product.

16. The non-transitory computer-readable recording medium storing a program for causing a computer to execute a process according to claim 15, wherein the computer acquires the product data from a memory of the computer.

* * * * *